United States Patent

Ohwe et al.

(10) Patent No.: US 6,583,962 B2
(45) Date of Patent: Jun. 24, 2003

(54) HEAD SLIDER SUPPORTING DEVICE, DISK DEVICE AND SUSPENSION HAVING THERMAL PROTECTION FOR HEAD IC CHIP

(75) Inventors: Takeshi Ohwe, Kawasaki (JP); Toru Watanabe, Kawasaki (JP); Ryosuke Koishi, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 10/174,607

(22) Filed: Jun. 19, 2002

(65) Prior Publication Data

US 2002/0159194 A1 Oct. 31, 2002

Related U.S. Application Data

(60) Division of application No. 09/273,000, filed on Mar. 19, 1999, now Pat. No. 6,437,944, which is a continuation-in-part of application No. 09/044,155, filed on Mar. 19, 1998, now abandoned.

(30) Foreign Application Priority Data

Oct. 20, 1997 (JP) .............................................. 9-287342
Mar. 20, 1998 (JP) ........................................... 10-072883

(51) Int. Cl.[7] ............................. G11B 5/48; G11B 21/16
(52) U.S. Cl. ................................................... 360/244.1
(58) Field of Search ............................ 360/244.1, 244.9, 360/244.2

(56) References Cited

U.S. PATENT DOCUMENTS

| 4,616,279 | A | | 10/1986 | Poorman |
| 5,014,145 | A | | 5/1991 | Hosokawa et al. |
| 5,055,969 | A | | 10/1991 | Putnam |
| 5,245,489 | A | | 9/1993 | Kimura et al. |
| 5,528,819 | A | | 6/1996 | McKay et al. |
| 6,014,289 | A | | 1/2000 | Goss |
| 6,134,084 | A | * | 10/2000 | Ohwe et al. ............. 360/244.1 |
| 6,266,213 | B1 | * | 7/2001 | Hiraoka .................... 360/244.1 |
| 6,278,583 | B1 | * | 8/2001 | Adley ...................... 360/244.1 |
| 6,437,944 | B2 | * | 8/2002 | Ohwe et al. ............. 360/244.1 |

FOREIGN PATENT DOCUMENTS

| DE | 10106338 A1 | * | 11/2001 |
| EP | 902427 | | 3/1999 |
| GB | 2256740 | | 12/1992 |
| JP | 55-150130 | | 11/1980 |
| JP | 56-159864 | | 9/1981 |
| JP | 59-168968 | | 9/1984 |
| JP | 60-1614 | | 1/1985 |
| JP | 62-92111 | | 4/1987 |
| JP | 62-217476 | | 9/1987 |

(List continued on next page.)

Primary Examiner—William Klimowicz
(74) Attorney, Agent, or Firm—Greer, Burns & Crain, Ltd.

(57) ABSTRACT

A suspension has an extending end and the other end. A head IC chip mounting portion is provided between the extending end and the other end of the suspension. A head slider is loaded on a first surface of the suspension at a position on the side of the extending end with respect to the head IC chip mounting portion, the head slider integrally including a head. A head IC chip is mounted at the head IC chip mounting portion of the suspension. First wiring patterns extend along the suspension between a portion of the suspension, at which portion the head slider is loaded, and the head IC chip mounting portion. Second wiring patterns extend along the suspension between the head IC chip mounting portion and the other end of the suspension. The head IC chip is mounted at the head IC chip mounting portion in a condition in which a certain portion of the head IC chip is positioned on the side of a second surface of the suspension, which second surface is opposite to the first surface.

16 Claims, 22 Drawing Sheets

FOREIGN PATENT DOCUMENTS

| | | |
|---|---|---|
| JP | 63-204508 | 8/1988 |
| JP | 63-292412 | 11/1988 |
| JP | 3-25717 | 2/1991 |
| JP | 3-108120 | 5/1991 |
| JP | 3-187295 | 8/1991 |
| JP | 3-192513 | 8/1991 |
| JP | 3-272015 | 12/1991 |
| JP | 3-290801 | 12/1991 |
| JP | 5-282642 | 10/1993 |
| JP | 6-215513 | 8/1994 |
| JP | 2000-339649 | * 12/2000 |

* cited by examiner

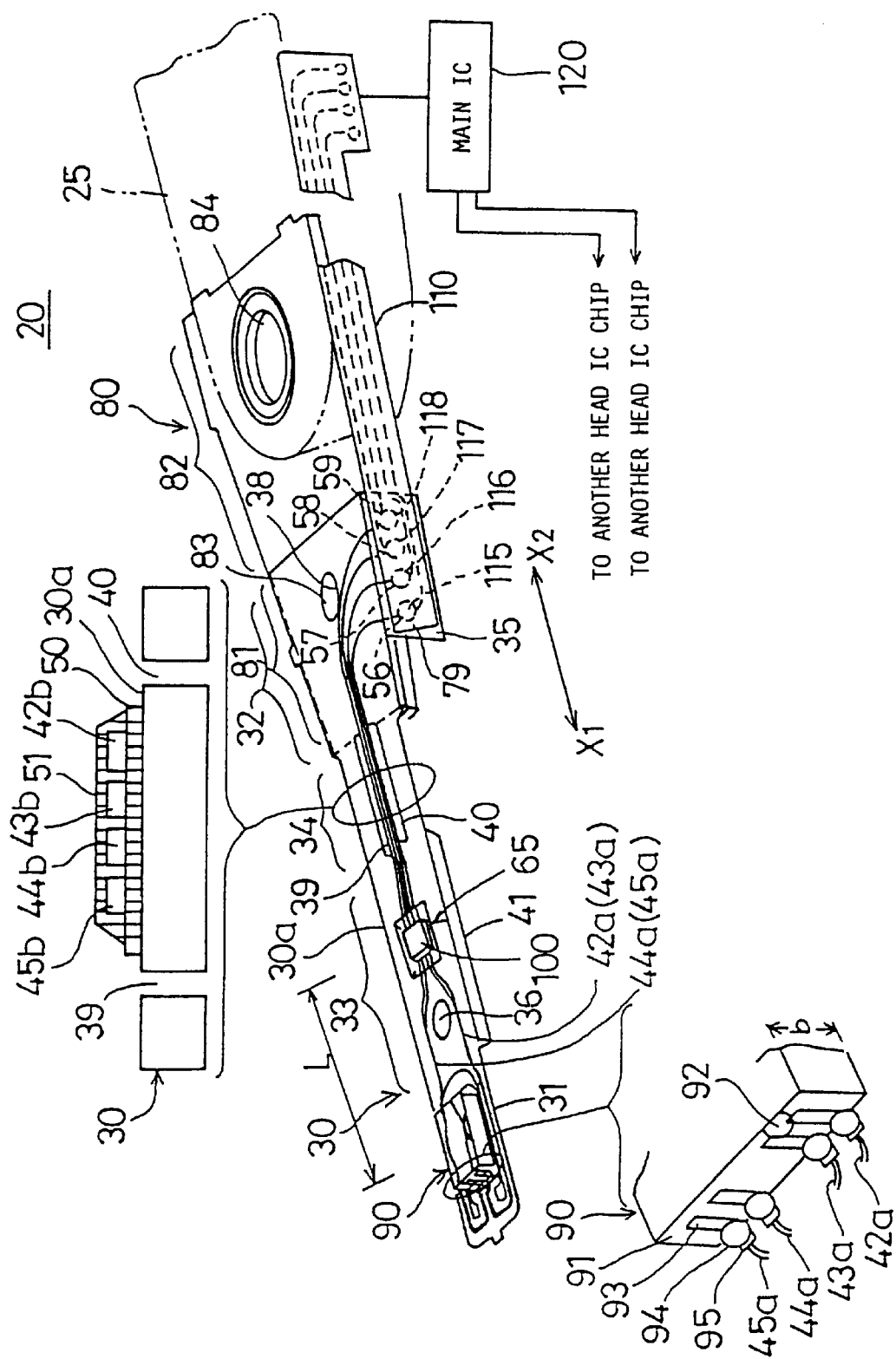

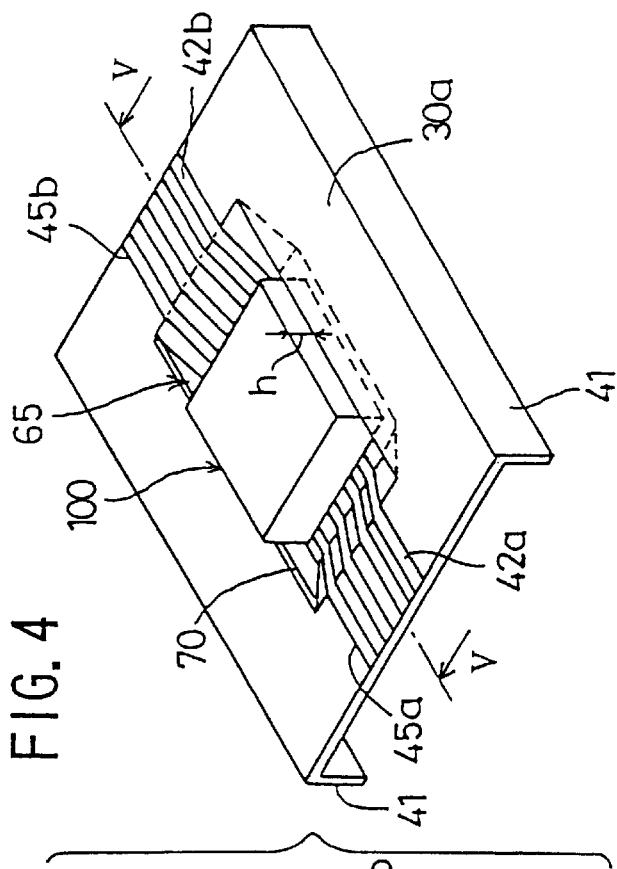
FIG. 4
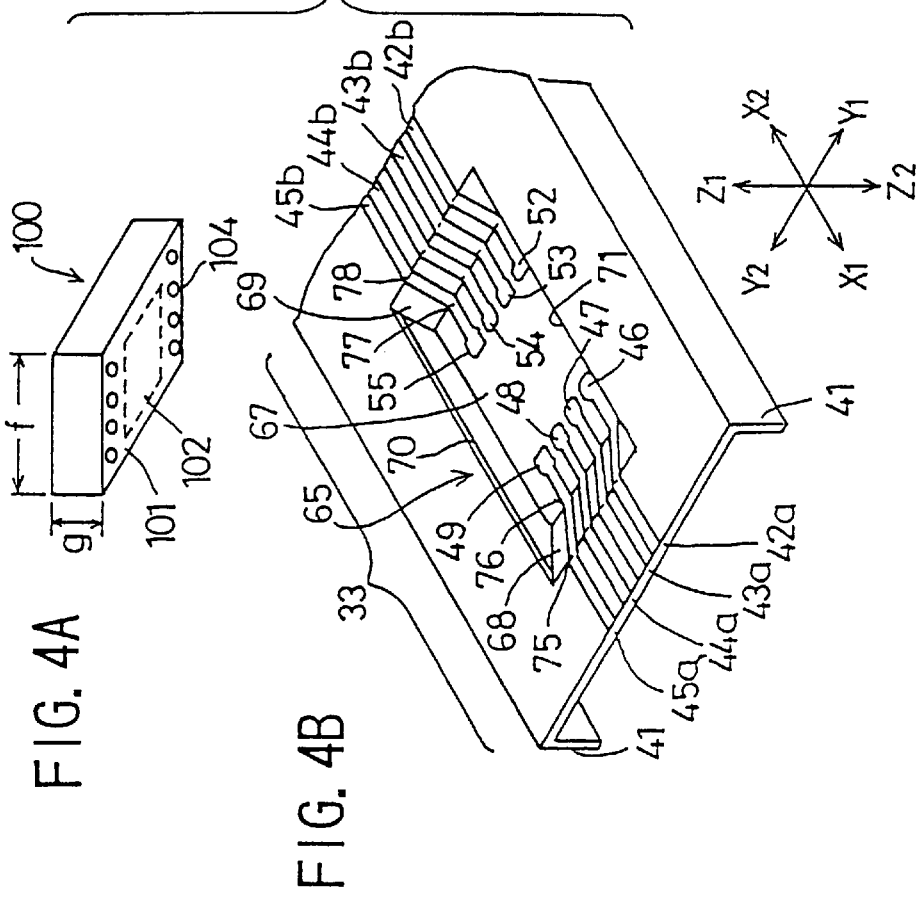
FIG. 4A
FIG. 4B

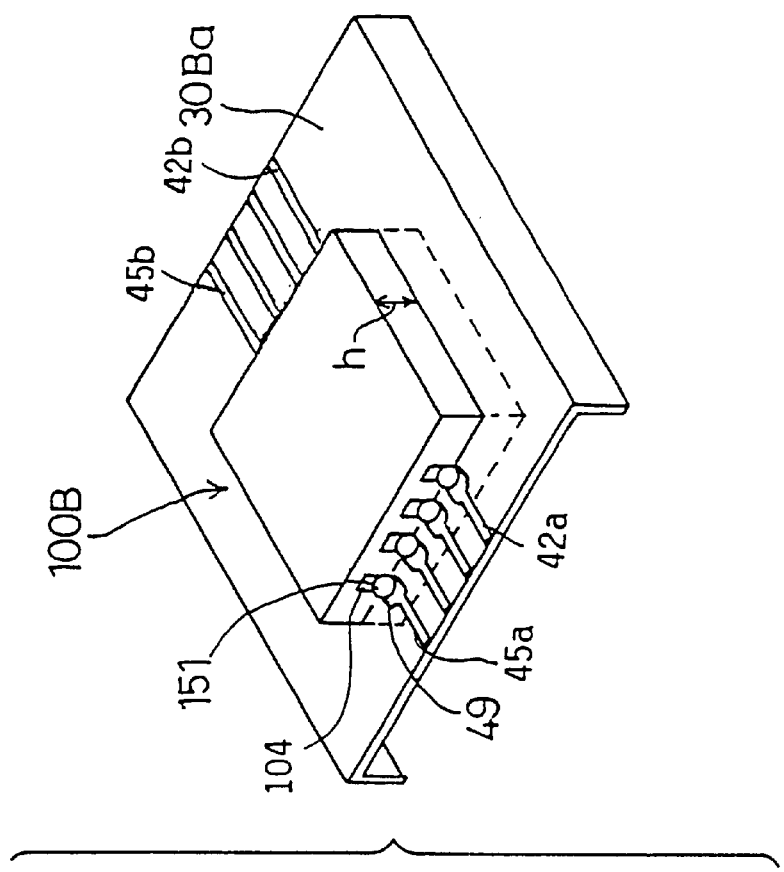
FIG. 7
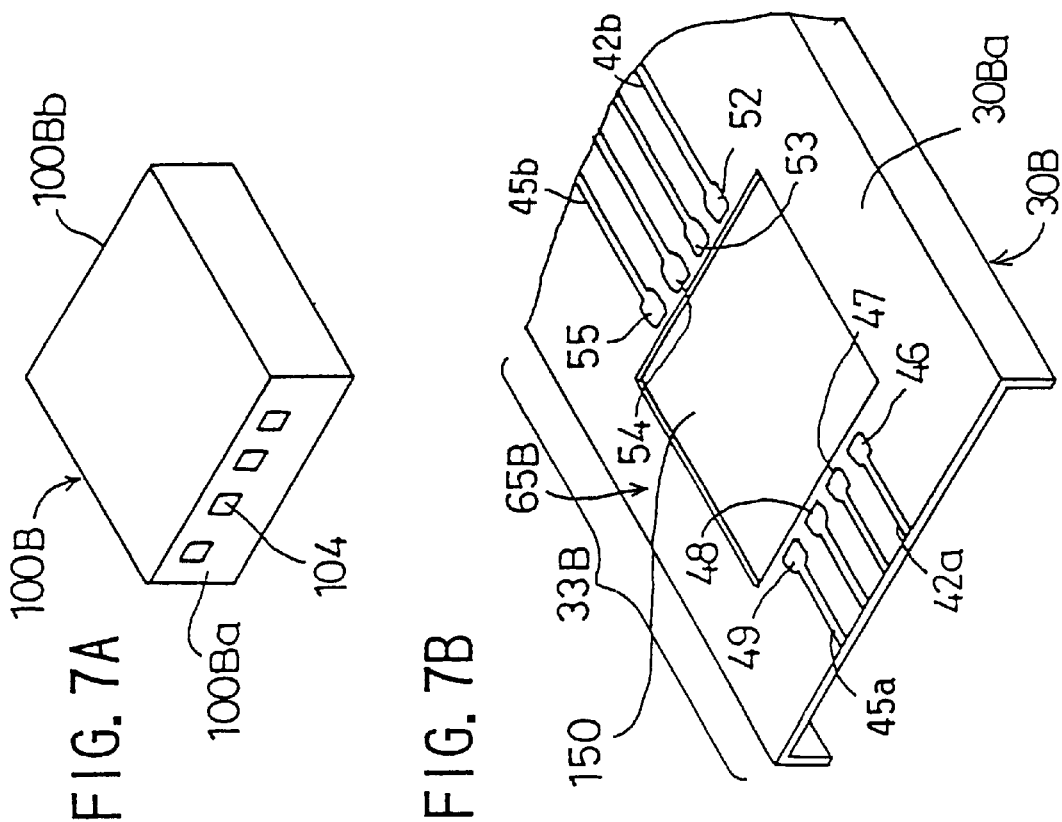
FIG. 7A
FIG. 7B

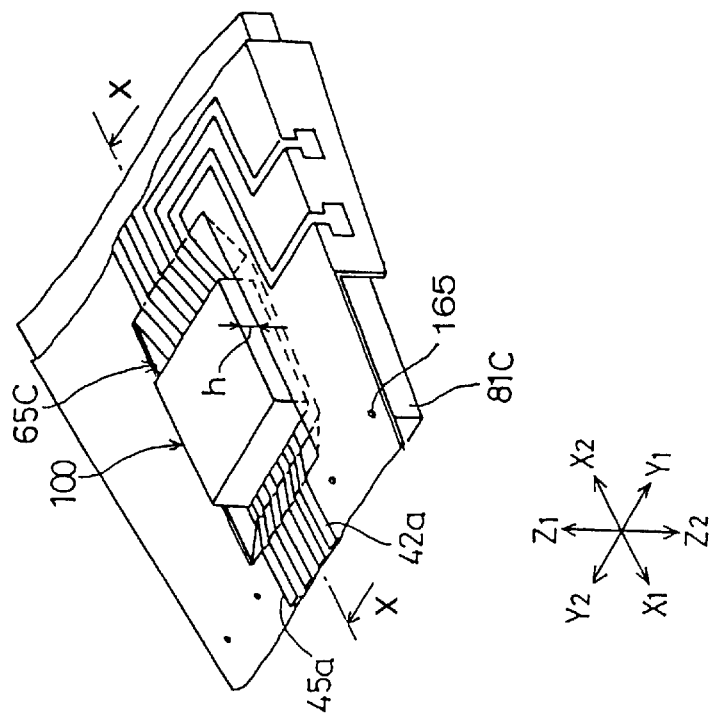
FIG.9
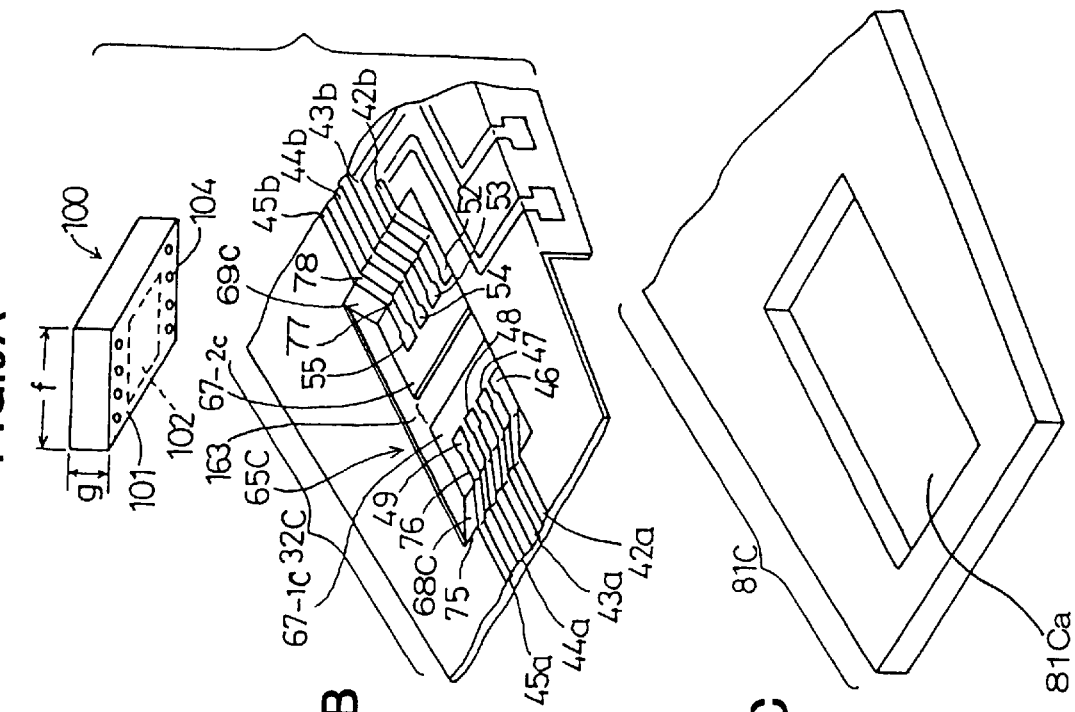
FIG.9A
FIG.9B
FIG.9C

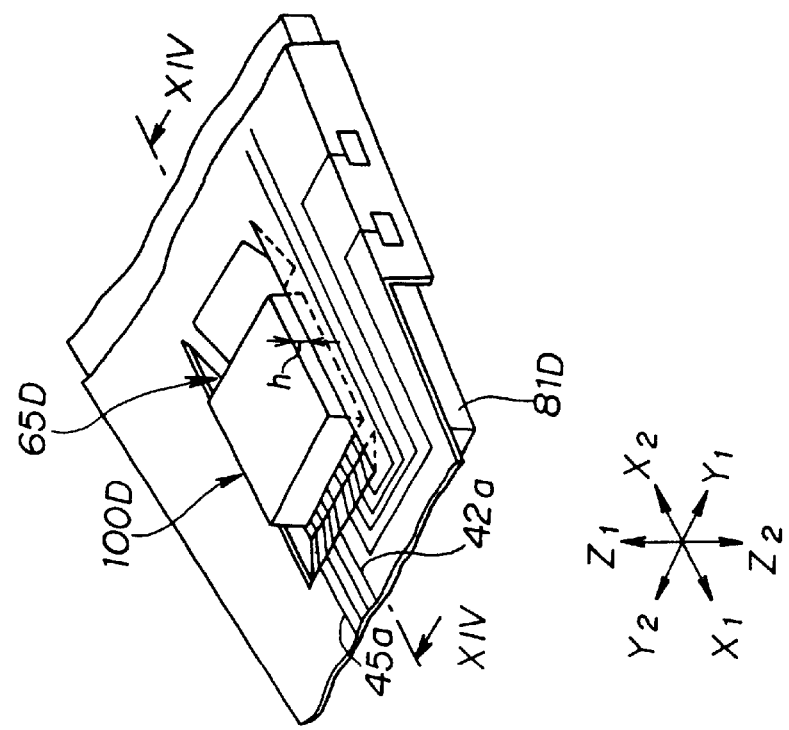
FIG.13
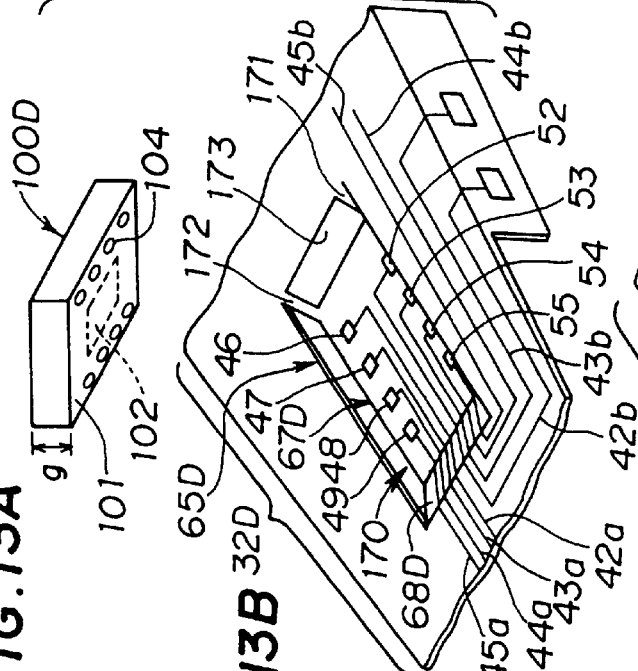
FIG.13A
FIG.13B
FIG.13C

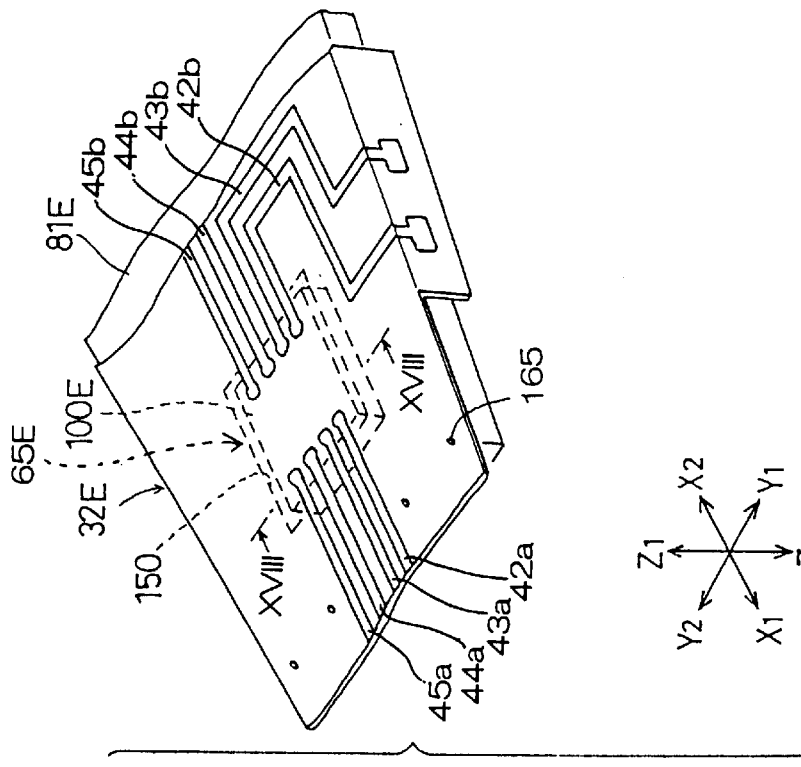
FIG.17
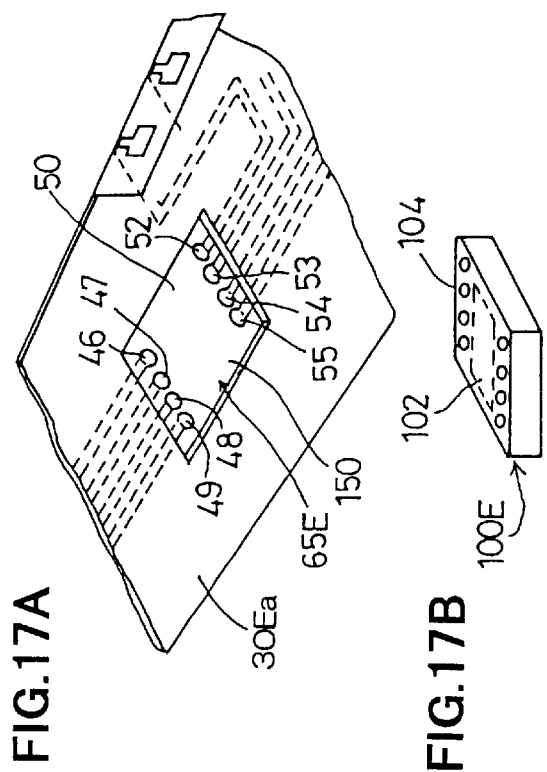
FIG.17A
FIG.17B
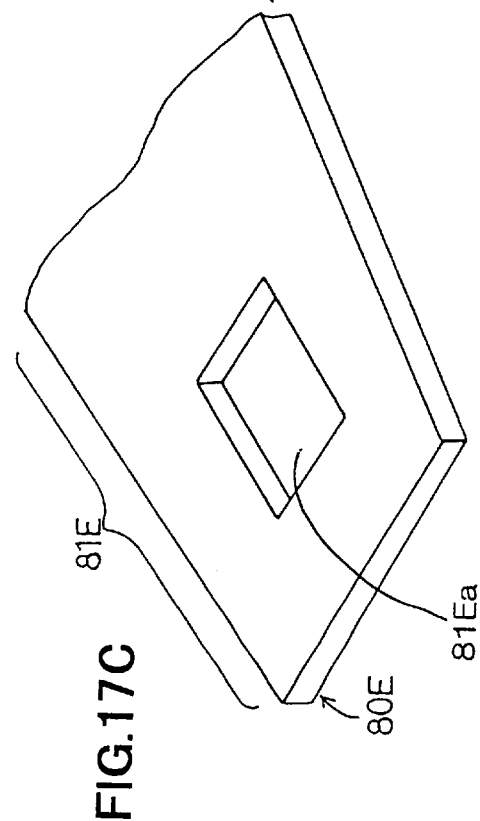
FIG.17C

HEAD SLIDER SUPPORTING DEVICE, DISK DEVICE AND SUSPENSION HAVING THERMAL PROTECTION FOR HEAD IC CHIP

This is a divisional of application Ser. No. 09/273,000, filed Mar. 19, 1999, now U.S. Pat. No. 6,437,944.

This is a continuation-in-part application of U.S. patent application Ser. No. 09/044,155, filed on Mar. 19, 1998 now abandoned.

BACKGROUND OF THE INVENTION

1. Field of the Invention

The present invention relates to a head slider supporting device, a disk device and a suspension, and, in particular, to a magnetic head slider supporting device, an optical head slider supporting device, a magnetic disk device, an optical disk device and a suspension.

As a result of an increase of the frequency of a signal which an information processing apparatus processes, it is requested that the write current frequency of a magnetic disk device be increased from 70 MHz to 200 through 300 MHz, for example. In order to increase the write current frequency, it is necessary to reduce the inductance and the electrostatic capacity of a signal transmission path from a magnetic head slider to a head IC. For this purpose, it is effective to provide the head IC at a position near to the magnetic disk slider. Further, thinning of the magnetic disk device is also requested. It is necessary that the head IC be loaded in the magnetic disk device in a condition in which the thinning of the magnetic disk device is not disturbed, and, also, that the head IC does not come into contact with a magnetic disk and so forth even when a shock is applied to the magnetic disk device.

2. Description of the Related Art

Magnetic disk devices, in each of which a head IC for amplifying a signal read through a magnetic head slider is installed on an arm, are disclosed in Japanese Laid-Open Patent Application Nos.62-217476, 3-108120, 3-187295, 3-192513 and so forth.

However, in each of the above-mentioned magnetic disk devices, because the distance between the magnetic head slider and the head IC is long, it is difficult to reduce the inductance and the electrostatic capacity of the signal transmission path from the magnetic head slider to the head IC. Further, the head IC is packaged in a synthetic resin, and, thereby, is thick. As a result, in order to prevent the head IC from coming into contact with a magnetic disk and so forth when a shock is applied to the magnetic disk device, it is necessary to elongate the distance between adjacent magnetic disks. As a result, the magnetic disk device is thick. Further, because the head IC is packaged in the synthetic resin, the head IC is heavy. As a result, the magnetic head slider is heavy. Thereby, the flying stability of the magnetic head slider above the magnetic disk is degraded, and also, there is a possibility that, when the magnetic head slider comes into contact with a magnetic disk due to a strong shock applied to the magnetic disk device, the shock applied to the magnetic disk is so strong that the magnetic disk is damaged.

As shown in FIG. 1, in a head slider supporting device 1, on the top surface 2a of a suspension 2 (hereinafter, the position of the suspension shown in FIG. 1 is a reference position thereof, and 'the top surface' of the suspension means the top surface in this position of the suspension), wiring patterns 3 are formed from the extending end to the fixed end of the suspension 2, and the magnetic head slider 4 is loaded on the top surface 2a of the suspension 2 at the extending end of the suspension 2.

Here, provision of the head IC 5 will be considered. Due to the arrangement of the wiring patterns 3, a surface at which the head IC is loaded is limited to the top surface 2a of the suspension 2. When considering an increase of the write current frequency, it is preferable that the head IC 5 be provided at a position near to the magnetic head slider 4. Therefore, it is assumed that the head IC 5 is loaded on the top surface 2a of the suspension 2 near the magnetic head slider 4.

In order to prevent the head IC 5 from coming into contact with a magnetic disk 6 even when a strong shock is applied to the magnetic disk device, it is necessary that a gap 7 of the distance 'a' equal to or longer than 0.15 mm be provided between the head IC 5 and the magnetic disk 6.

Recently, in order to thin the magnetic disk device, the magnetic head slider 4 of a small size (a so-called pico-slider, the height 'b' of which is 0.3 mm) has been used. As a result, the distance 'c' between the suspension 2 and the magnetic disk 6 is small.

When considering a bare head IC 5, the bare head IC 5 is cut out from a wafer. Accordingly, the thickness of the bare head IC 5 is determined by the thickness of the wafer. At the present time, it is difficult to thin the wafer to less than 0.3 mm. Accordingly, the height (thickness) 'd' of the head IC 5 is approximately 0.3 mm minimum.

Therefore, when the bare head IC 5 is simply loaded on the top surface 2a of the suspension 2, it is difficult to obtain the gap equal to or longer than 0.15 mm between the head IC 5 and the magnetic disk 6. Thus, a special device is needed when the bare head IC 5 is loaded on the top surface 2a of the suspension 2.

SUMMARY OF THE INVENTION

An object of the present invention is to provide a head slider supporting device, a disk device and a suspension by which the above-described problem is solved.

A head slider supporting device, according to the present invention, comprises:

a head slider having a head loaded thereon;

a head IC which controls the head;

a substantially flat supporting member having a portion at which the head slider is loaded and a head IC mounting portion at which the head IC is mounted; and wires electrically connecting the head slider and the IC, wherein the head IC is mounted at the head IC mounting portion in a condition in which the head IC projects from one surface of the supporting member so that an amount of projecting of the head IC from the one surface of the supporting member is smaller than the thickness of the head IC.

Thus, the length by which the head IC protrudes from the surface of the supporting member is shorter than the thickness of the head IC. As a result, in a case where a so-called pico-slider is used as the head slider, a gap can be provided between the head IC and a disk such that, even when a strong shock is applied to the disk device, the head IC is prevented from coming into contact with the disk.

A head slider supporting device, according to another aspect of the present invention, comprises:

a suspension, a head IC chip mounting portion being provided on a first surface of the suspension;

a head slider loaded on the first surface of the suspension at an extending end thereof, the head slider integrally including a head;

a head IC chip mounted at the head IC chip mounting portion of the suspension; and wiring patterns extending along the suspension from a portion of the suspension, at which portion the head slider is loaded, via the head IC chip mounting portion, wherein the head IC chip is mounted at the head IC chip mounting portion in a condition in which the head IC chip is lowered so that an amount of projecting of the head IC chip from the first surface of the suspension is smaller than the thickness of the head IC chip.

Thus, the length by which the head IC chip protrudes from the first surface of the suspension is shorter than the thickness of the head IC chip. As a result, in a case where a so-called pico-slider is used as the head slider, a gap can be provided between the head IC chip and a disk such that, even when a strong shock is applied to the disk device, the head IC chip is prevented from coming into contact with the disk. Thus, the disk device can be provided in which the pico-slider is used as the head slider, and also, the head IC chip is mounted on the first surface of the suspension on which the head slider is loaded. Each of the wiring patterns, electrically connecting the head slider with the head IC chip, can be as short as several millimeters, because the head IC chip is mounted on the first surface on which the head slider is loaded. As a result, the inductances of the wiring patterns are small. Further, the electrostatic capacities between adjacent wiring patterns are small. Therefore, in a case where the disk device is the magnetic disk device, a signal of, for example, 200 MHz, higher than 70 MHz, as in the case of the related art, can be written in and read from the magnetic disk in the magnetic disk device.

The head IC chip mounting portion may extend in the suspension along the longitudinal direction of the suspension, both sides of the head IC chip mounting portion being cut and a middle portion of the head IC chip mounting portion projecting on the side of a second surface of the suspension, which second surface is opposite to the first surface, the head IC chip being mounted on the middle portion of the head IC chip mounting portion.

Thereby, the head IC chip mounting portion can be formed without drawing the suspension. Accordingly, the head IC chip mounting portion can be formed without an excessive stress being applied to the suspension. Further, because both sides of the head IC chip mounting portion are cut along the longitudinal direction of the suspension, the head IC chip mounting portion can be formed with the characteristics of the suspension being affected thereby as little as possible.

The head IC chip may comprise a first half portion and a second half portion, the first half portion having an extending portion, which extends laterally beyond the second half portion of the head IC chip on the side of the first half portion; and the head IC chip mounting portion includes an opening having a size such that the second half portion of the head IC chip passes through the opening and the extending portion of the first half portion of the head IC chip is supported by a peripheral portion of the opening.

Thereby, the head IC chip mounting portion can be formed with the characteristics of the suspension being affected thereby as little as possible. Further, merely by causing the second half portion of the head IC chip to pass through the opening and causing the extending portion of the first half portion of the head IC chip to be supported by the peripheral portion of the opening, the height by which the head IC chip protrudes from the first surface of the suspension can be precisely determined. Further, by determining the size of the opening such that the second half portion fits into the opening, providing terminals on the bottom surface of the head IC chip and providing terminals of the wiring patterns along the periphery of the opening, it is possible that the terminals of the head IC chip precisely face the terminals of the wiring patterns merely by causing the second half portion of the head IC chip to pass through the opening. Thereby, it is possible to electrically connect the terminals of the head IC chip with the terminals of the wiring patterns with high reliability.

The head IC chip mounting portion may comprise an opening having a size such that a certain portion of the head IC chip passes through the opening.

Thereby, the head IC chip mounting portion can be formed with the characteristics of the suspension being affected thereby as little as possible. In this case, terminals may be provided on side walls of the head IC chip, terminals of the wiring patterns may be provided on a peripheral portion of the opening, and the terminals on the side walls of the head IC chip may be electrically connected with the terminals of the wiring patterns. Further, it is possible to mount the head IC chip at the head IC chip mounting portion in a condition in which a portion of the head IC chip is lowered from the first surface of the suspension.

The suspension may have a rigid portion between the extending end and the other end, the rigid portion having a rib on at least one side thereof so that the rigid portion is prevented from bending; and the head IC chip mounting portion may be formed in the rigid portion.

Thereby, the head IC chip mounting portion can be formed with the characteristics of the suspension being affected thereby as little as possible.

A disk device, according to the present invention, comprises:

an actuator;

a disk which is rotated;

an arm which is driven by the actuator; and a head slider supporting device, which is rotated integrally with the arm, the head slider supporting device comprising:

a head slider having a head loaded thereon;

a head IC which controls the head;

a substantially flat supporting member having a portion at which the head slider is mounted and a head IC mounting portion at which the head IC is mounted; and wires electrically connecting the head slider and the head IC, wherein the head IC is mounted at the head IC mounting portion in a condition in which the head IC projects from one surface of the supporting member so that an amount of projecting of the head IC from the one surface of the supporting member is smaller than the thickness of the head IC.

A disk device, according to another aspect of the present invention, comprising:

an actuator;

a disk which is rotated;

an arm which is driven by the actuator; and a head slider supporting device, which is rotated integrally with the arm, the head slider supporting device comprising:

a suspension, a head IC chip mounting portion being provided on one surface of the suspension;

a head slider loaded on the one surface of the suspension at an extending end thereof, the head slider integrally including a head;

a head IC chip mounted at the head IC chip mounting portion of the suspension; and wiring patterns extending along the suspension from a portion of the suspension, at which portion the head slider is loaded, via the head IC chip mounting portion, wherein the head IC chip is mounted at the head IC chip mounting portion in a condition in which the head IC chip is lowered so that an amount of projecting of the head IC chip from the one surface of the suspension is smaller than the thickness of the head IC chip.

Thus, as described above, the length by which the head IC chip protrudes from the one surface of the suspension is shorter than the thickness of the head IC chip. As a result, in a case where a so-called pico-slider is used as the head slider, a gap can be provided between the head IC chip and a disk such that, even when a strong shock is applied to the disk device, the head IC chip is prevented from coming into contact with the disk. Thus, the disk device can be provided in which the pico-slider is used as the head slider, and, also, the head IC chip is mounted on the one surface of the suspension. Each of the wiring patterns, electrically connecting the head slider with the head IC chip, can be short, because the head IC chip is mounted on the one surface on which the head slider is loaded. As a result, the inductances of the first wiring patterns are small. Further, the capacities between adjacent first wiring patterns are small. Therefore, in a case where the disk device is the magnetic disk device, a signal of, for example, 200 MHz, higher than 70 MHz, as in the case of the related art, can be written in and read from the magnetic disk in the magnetic disk device.

A suspension, according to the present invention, has an extending end and the other end, a head IC chip mounting portion being provided between the extending end and the other end thereof, wherein:

a head slider is loaded on the suspension at the extending end thereof, the head slider integrally including a head;

a head IC chip is mounted at the head IC chip mounting portion of the suspension;

first wiring patterns extend along the suspension between a portion of the suspension, at which portion the head slider is loaded, and the head IC chip mounting portion; and second wiring patterns extend along the suspension from the head IC chip mounting portion, wherein the head IC chip is mounted at the head IC chip mounting portion in a condition in which the head IC chip projects from one surface of the suspension so that an amount of projecting of the head IC chip from the one surface of the suspension is smaller than the thickness of the head IC chip.

Thus, as described above, the length by which the head IC chip protrudes from the one surface of the suspension is shorter than the thickness of the head IC chip. As a result, in a case where a so-called pico-slider is used as the head slider, a gap can be provided between the head slider and a disk such that, even when a strong shock is applied to the disk device, the head IC chip is prevented from coming into contact with the disk. Thus, the disk device can be provided in which the pico-slider is used as the head slider. The head slider can be loaded on the one surface of the suspension on which the head IC chip is mounted. Each of the first wiring patterns, electrically connecting the head slider with the head IC chip, can be short, because the head IC chip is mounted on the one surface on which the head slider is loaded. As a result, the inductances of the first wiring patterns are small. Further, the electrostatic capacities between adjacent first wiring patterns are small. Therefore, in a case where the disk device is the magnetic disk device, a signal of, for example, 200 MHz, higher than 70 MHz, as in the case of the related art, can be written in and read from the magnetic disk in the magnetic disk device.

The head IC chip mounting portion may extend in the suspension along the longitudinal direction of the suspension, both sides of the head IC chip mounting portion being cut and a middle portion of the head IC chip mounting portion projecting on the side of the other surface of the suspension, the head IC chip being mounted on the middle portion of the head IC chip mounting portion.

Thereby, the head IC chip mounting portion can be formed without drawing the suspension. Accordingly, the head IC chip mounting portion is formed without an excessive stress being applied to the suspension. Further, because both sides of the head IC chip mounting portion are cut along the longitudinal direction of the suspension, the head IC chip mounting portion can be formed with the characteristics of the suspension being affected thereby as little as possible.

The head IC chip mounting portion may comprise an opening having a size such that a certain portion of the head IC chip passes through the opening.

Thereby, the head IC chip mounting portion can be formed with the characteristics of the suspension being affected thereby as little as possible.

The suspension may have a rigid portion having a rib portion on at least one side of the rigid portion so that the rigid portion is prevented from bending; and the head IC chip mounting portion may be formed in the rigid portion.

Thereby, the head IC chip mounting portion can be formed with the characteristics of the suspension being affected thereby as little as possible.

Both sides of the head IC chip mounting portion may be cut, and, also, a center of the head IC chip mounting portion may be cut in a direction perpendicular to a direction in which both sides of the head IC chip mounting portion are cut so that the head IC chip mounting portion is divided into two parts, middle portions of the two parts of the head IC chip mounting portion projecting on the side of a second surface of the suspension, which second surface is opposite to the first surface, the head IC chip being mounted on, so as to extend over, the middle portions of the two parts of the head IC chip mounting portion on surfaces thereof on the side of the first surface of the suspension; and the wiring patterns reach the middle portions via slope portions which are formed at both ends of the head IC chip mounting portion when the middle portions project on the side of the second surface, and pad terminals which terminate the wiring patterns, respectively, are provided on the middle portions.

In this arrangement, the slope portions are merely bent but are not lengthened when a press machine is used for causing the middle portion of the head IC chip mounting portion to project on the side of the second surface. Thereby, cutoff of the wiring patterns formed on the slope portions can be effectively avoided.

Both sides of the head IC chip mounting portion may be cut, and, also, one end of the head IC chip mounting portion may be cut in a direction perpendicular to a direction in which both sides of the head IC chip mounting portion are cut so that an opening is formed but a thin connection portion is left which bridges the opening, a middle portion of the head IC chip mounting portion projecting on the side of a second surface of the suspension, which second surface is opposite to the first surface, the head IC chip being mounted on the middle portion of the head IC chip mounting portion on a surface thereof on the side of the first surface of the suspension; and the wiring patterns reach the middle portion via a slope portion which is formed at the other end of the head IC chip mounting portion when the middle portion projects from the second surface, and pad terminals which terminate the wiring patterns, respectively, are provided on the middle portion.

In this arrangement, the thin connection portion effectively lengthens while the slope portion is only bent but is not lengthened. Thereby, cutoff of the wiring patterns formed on the slope portion can be effectively avoided.

A head slider supporting device, according to another aspect of the present invention, comprises:

a suspension, having an extending end and the other end, having a fixing portion on the side of the other end, and having a head IC chip mounting portion at the fixing portion;

a head slider loaded on a first surface of the suspension at the extending end thereof, the head slider integrally including a head;

a head IC chip mounted at the head IC chip mounting portion of the suspension;

wiring patterns extending along the portion the head slider is loaded, to the head IC chip mounting portion, and further extending from the head IC chip mounting portion; and a plate-shaped junction member, on which the fixing portion of the suspension is mounted, wherein:

both sides of the head IC chip mounting portion are cut, and, also, a center of the head IC chip mounting portion is cut in a direction perpendicular to a direction in which both sides of the head IC chip mounting portion are cut so that the head IC chip mounting portion is divided into two parts, and middle portions of the two parts of the head IC chip mounting portion projecting on the side of a second surface of the suspension, which second surface is opposite to the first surface, the head IC chip being mounted on, so as to extend over, the middle portions of the two parts of the head IC chip mounting portion on surfaces thereof on the side of the first surface of the suspension;

the wiring patterns reach the middle portions via slope portions which are formed at both the ends of the head IC chip mounting portion when the middle portions project from the second surface, and pad terminals which terminate the wiring patterns, respectively, are provided on the middle portions; and the junction member has an opening in which the head IC chip mounting portion at which the head IC chip is mounted is inserted.

In this arrangement, the slope portions are merely bent but are not lengthened when a press machine is used for causing the middle portion of the head IC chip mounting portion to project on the side of the second surface. Thereby, cutoff of the wiring patterns formed on the slope portions can be effectively avoided.

Further, as a result of the junction member having the opening, the head IC chip mounting portion is provided at the fixing portion located on the side of the other end of the suspension. That is, a place where the head IC chip is located is near to the rotation axis of the head slider supporting device. In comparison to a case where the head IC chip is located near to the extending end of the suspension, the inertia moment when the head slider supporting mechanism operates is small, and, thereby, it is possible to achieve a high-accuracy, high-speed seeking operation.

A head slider supporting device, according to another aspect of the present invention, comprises:

a suspension, having an extending end and the other end, having a fixing portion at the other end, and having a head IC chip mounting portion at the fixing portion;

a head slider loaded on a first surface of the suspension at the extending end thereof, the head slider integrally including a head;

a head IC chip mounted at the head IC chip mounting portion of the suspension;

wiring patterns extending along the suspension from a portion of the suspension, at which portion the head slider is loaded, to the head IC chip mounting portion, and further extending from the head IC chip mounting portion; and a plate-shaped junction member, on which the fixing portion of the suspension is mounted, wherein:

both sides of the head IC chip mounting portion are cut, and, also, one end of the head IC chip mounting portion is cut in a direction perpendicular to a direction in which both sides of the head IC chip mounting portion are cut so that an opening is formed but a thin connection portion is left which bridges the opening, a middle portion of the head IC chip mounting portion projecting on the side of a second surface of the suspension, which second surface is opposite to the first surface, the head IC chip being mounted on the middle portion of the head IC chip mounting portion on a surface thereof on the side of the first surface of the suspension;

the wiring patterns reach the middle portion via a slope portion which is formed at the other end of the head IC chip mounting portion when the middle portion projects from the second surface, and pad terminals which terminate the wiring patterns, respectively, are provided on the middle portion; and the junction member has an opening, in which the head IC chip mounting portion at which the head IC chip is mounted is inserted.

In this arrangement, the thin connection portion effectively lengthens while the slope portion is only bent but is not lengthened. Thereby, cutoff of the wiring patterns formed on the slope portion can be effectively avoided.

Further, as a result of the junction member having the opening, the head IC chip mounting portion is provided at the fixing portion located on the side of the other end of the suspension. That is, a place where the head IC chip is located is near to the rotation axis of the head slider supporting device. In comparison to a case where the head IC chip is located near to the extending end of the suspension, the inertia moment when the head slider supporting mechanism operates is small, and, thereby, it is possible to achieve a high-accuracy, high-speed seeking operation.

A head slider supporting device, according to another aspect of the present invention, comprises:

a suspension, having a first surface and a second surface opposite to the first surface, and having a head IC chip mounting portion on the second surface;

a head slider loaded on the first surface of the suspension at an extending end thereof, the head slider integrally including a head;

a head IC chip mounted at the head IC chip mounting portion of the suspension; and wiring patterns extending on the first surface of the suspension from a portion of the suspension, at which portion the head slider is loaded, via the head IC chip mounting portion;

wherein:
  the suspension includes a metal plate body and a base layer formed on the metal plate body, the wiring patterns being formed on the base layer;
  the head IC chip mounting portion includes an opening formed in the metal plate body and having a size corresponding to the head IC chip, the base layer covering the opening on the side of the first surface, and pad terminals which terminate the wiring patterns, respectively, are exposed on a surface of the base layer on the side of the second surface of the suspension; and
  the head IC chip is mounted at the head IC chip mounting portion so that the head IC chip is fitted into the opening of the metal plate body from the side of the second surface.

In this arrangement, as a result of the head IC chip being fitted into the opening from the side of the second surface, it is possible to shorten the length by which the head IC chip projects from the second surface. Further, the opening is formed in the suspension but the suspension is not bent. As a result, cutoff of the wiring patterns can be effectively avoided.

A head slider supporting device, according to another aspect of the present invention, comprises:

a suspension having an extending end and the other end, having a first surface and a second surface opposite to the first surface, having a fixing portion on the side of the other end, and having a head IC chip mounting portion at the fixing portion;

a head slider loaded on the first surface of the suspension at the extending end thereof, the head slider integrally including a head;

a head IC chip mounted at the head IC chip mounting portion of the suspension;

wiring patterns extending on the first surface of the suspension from a portion of the suspension, at which portion the head slider is loaded, to the head IC chip mounting portion, and further extending from the head IC chip mounting portion; and a plate-shaped junction member on which the fixing portion of the suspension is mounted, wherein:
  the suspension includes a metal plate body and a base layer formed on the metal plate body, the wiring patterns being formed on the base layer;
  the head IC chip mounting portion includes an opening formed in the metal plate body and having a size corresponding to the head IC chip, the base layer covering the opening on the side of the first surface, and pad terminals which terminate the wiring patterns, respectively, are exposed on a surface of the base layer on the side of the second surface of the suspension;
  the head IC chip is mounted at the head IC chip mounting portion so that the head IC chip is fitted into the opening of the metal plate body from the side of the second surface; and
  the junction member has an opening, in which the head IC chip mounted at the head IC chip mounting portion is inserted.

In this arrangement, as a result of the head the second surface, it is possible to shorten the length by which the head IC chip projects from the second surface. Further, the opening is formed in the suspension but the suspension is not bent. As a result, cutoff of the wiring patterns can be effectively avoided.

Further, as a result of the junction member having the opening, the head IC chip mounting portion is provided at the fixing portion located on the side of the other end of the suspension. That is, a place where the head IC chip is located is near to the rotation axis of the head slider supporting device. In comparison to a case where the head IC chip is located near to the extending end of the suspension, the inertia moment when the head slider supporting mechanism operates is small, and, thereby, it is possible to achieve a high-accuracy, high-speed seeking operation.

A disk device, according to another aspect of the present invention, comprises:

an actuator;

a disk which is rotated;

an arm which is driven by the actuator; and any one of the above-described head slider supporting devices, which is rotated integrally with the arm.

In this arrangement, because any one of the above-described head slider supporting devices is used, the head IC chip is prevented from hitting the magnetic disk even when a strong shock is applied to the magnetic disk device. Further, it is possible to achieve the magnetic disk device which can write and read a signal of, for example, up to 200 MHz, higher than 70 MHz, as in the case of the related art.

A suspension, according to another aspect of the present invention, has an extending end and the other end, has fixing portion on the side of the other end, which portion is mounted on a junction member, and has a head IC chip mounting portion at the fixing portion, wherein:
  a head slider is loaded on a first surface of the suspension at the extending end thereof, the head slider integrally including a head;
  a head IC chip is mounted at the head IC chip mounting portion of the suspension; and
  wiring patterns extend along the suspension from a portion of the suspension, at which portion the head slider is loaded, to the head IC chip mounting portion, and further extend from the head IC chip mounting portion, wherein:
  both sides of the head IC chip mounting portion are cut, and, also, a center of the head IC chip mounting portion is cut in a direction perpendicular to a direction in which both sides of the head IC chip mounting portion are cut so that the head IC chip mounting portion is divided into two parts, and middle portions of the two parts of the head IC chip mounting portion projecting on the side of a second surface of the suspension, which second surface is opposite to the first surface, the head IC chip being mounted on surfaces of the middle portions of the two parts of the head IC chip mounting portion on the side of the first surface of the suspension; and the wiring patterns reach the middle portions via slope portions which are formed at both ends of the head IC chip mounting portion when the middle portions project from the second surface, and pad terminals which terminate the wiring patterns, respectively, are provided on the middle portions.

A suspension, according to another aspect of the present invention, has an extending end and the other end, has a fixing portion on the side of the other end, which portion is mounted on a junction member, and has a head IC chip mounting portion at the fixing portion, wherein:
a head slider is loaded on a first surface of the suspension at the extending end thereof, the head slider integrally including a head;
a head IC chip is mounted at the head IC chip mounting portion of the suspension; and
wiring patterns extend along the suspension from a portion of the suspension, at which portion the head slider is loaded, to the head IC chip mounting portion, and further extend from the head IC chip mounting portion, wherein:
both sides of the head IC chip mounting portion are cut, and, also, one end of the head IC chip mounting portion is cut in a direction perpendicular to a direction in which both sides of the head IC chip mounting portion are cut so that an opening is formed but a thin connection portion is left which bridges the opening, a middle portion of the head IC chip mounting portion projecting on the side of a second surface of the suspension, which second surface is opposite to the first surface, the head IC chip being mounted on the middle portion of the head IC mounting portion on a surface thereof on the side of the first surface of the suspension; and
the wiring patterns reach the middle portion via a slope portion which is formed at the other end of the head IC chip mounting portion when the middle portion projects from the second surface, and pad terminals which terminate the wiring patterns, respectively, are provided on the middle portion.

A suspension, according to another aspect of the present invention, includes a metal plate body, a base layer formed on the metal plate body, and wiring patterns formed on the base layer, the suspension having an extending end and the other end, having a fixing portion on the side of the other end, which portion is mounted on a junction member, and having a head IC chip mounting portion at the fixing portion, wherein:
a head slider is loaded on a first surface of the suspension at an extending end thereof, the head slider integrally including a head;
a head IC chip is mounted at the head IC chip mounting portion of the suspension;
wiring patterns extend on the first surface of the suspension from a portion of the suspension, at which portion the head slider is loaded, and further extend from the head IC chip mounting portion; and
the head IC chip mounting portion includes an opening formed in the metal plate body and having a size corresponding to the head IC chip, the base layer covering the opening on the side of the first surface, and pad terminals which terminate the wiring patterns, respectively, are exposed on a surface of the base layer on the side of a second surface of the suspension, which second surface is opposite to the first surface.

In each of these arrangements, because the head IC chip mounting portion is formed at the fixing portion, it is possible to achieve the suspension in which the head IC mounting portion is formed with the characteristics of the suspension being not affected thereby.

A suspension, according to another aspect of the present invention, has a first surface and a second surface opposite to the first surface, and has a rigid portion which has a rib portion on at least one side thereof so that the rigid portion is prevented from bending, a head IC chip mounting portion being formed in the rigid portion, wherein:
the head IC chip mounting portion has a head IC chip mounted thereon;
both sides of the head IC chip mounting portion are cut, and, also, a center of the head IC chip mounting portion is cut in a direction perpendicular to a direction in which both sides of the head IC chip mounting portion are cut so that the head IC chip mounting portion is divided into two parts, and middle portions of the two parts of the head IC chip mounting portion project on the side of the second surface of the suspension, the head IC chip being mounted on surfaces of the middle portions of the two parts of the head IC chip mounting portion on the side of the first surface of the suspension; and
the wiring patterns reach the middle portions via slope portions which are formed at both ends of the head IC chip mounting portion when the middle portions project on the side of the second surface, and pad terminals which terminate the wiring patterns, respectively, are provided on the middle portions.

A suspension, according to another aspect of the present invention, has a first surface and a second surface opposite to the first surface, and has a rigid portion which has a rib portion on at least one side thereof so that the rigid portion is prevented from bending, a head IC chip mounting portion being formed in the rigid portion, wherein:
the head IC chip mounting portion has a head IC chip mounted thereon;
both sides of the head IC chip mounting portion are cut, and, also, one end of the head IC chip mounting portion is cut in a direction perpendicular to a direction in which both sides of the head IC chip mounting portion are cut so that an opening is formed but a thin connection portion is left which bridge the opening, a middle portion of the head IC chip mounting portion projecting on the side of the second surface of the suspension, the head IC chip being mounted on the middle portion of the head IC mounting portion on a surface thereof on the side of the first surface of the suspension; and
the wiring patterns reaches the middle portion via a slope portion which is formed at the other end of the head IC chip mounting portion when the middle portion projects on the side of the second surface, and pad terminals which terminate the wiring patterns, respectively, are provided on the middle portions.

A suspension, according to another aspect of the present invention, has a rigid portion which has a rib portion on at least one side thereof so that the rigid portion is prevented from bending, a head IC chip mounting portion being formed in the rigid portion, wherein:

the head IC chip mounting portion has a head IC chip mounted thereon;

the head IC chip mounting portion includes an opening formed in a metal plate body and having a size corresponding to the head IC chip, a base layer covering the opening on the side of the first surface of the suspension, pad terminals which terminate the wiring patterns, respectively, being exposed on a surface of the base layer on the side of a second surface of the suspension, which second surface is opposite to the first surface.

In each of these arrangements, because the head IC chip mounting portion is formed in the rigid portion which is prevented from bending, it is possible to achieve the suspension in which the head IC mounting portion is formed with the characteristics of the suspension being not affected thereby.

Other objects and further features of the present invention will become more apparent from the following detailed description when read in conjunction with the accompanying drawings.

BRIEF DESCRIPTION OF THE DRAWINGS

FIG. 2 shows a perspective view of a magnetic head slider supporting device in a first embodiment of the present invention;

FIGS. 4, 4A and 4B show a structure of a portion at which a head IC chip is mounted in the magnetic head slider supporting device shown in FIG. 1;

FIGS. 7, 7A and 7B show a structure of a portion at which the head IC chip is mounted in a magnetic head slider supporting device in a third embodiment of the present invention;

FIGS. 9, 9A, 9B and 9C show a structure of a portion at which a head IC chip is mounted in the magnetic head slider supporting device shown in FIG. 8;

FIGS. 13, 13A, 13B and 13C show a structure of a portion at which a head IC chip is mounted in the magnetic head slider supporting device in the fifth embodiment of the present invention;

FIGS. 17, 17A, 17B and 17C show a structure of a portion at which a head IC chip is mounted in the magnetic head slider supporting device shown in FIG. 16;

DETAILED DESCRIPTIONS OF THE PREFERRED EMBODIMENTS

U.S. patent application Ser. No. 09/044,155, filed on Mar. 19, 1998, now abandoned, is incorporated herein by reference.

Each embodiment of the present invention has been obtained as a result of improving the magnetic head slider supporting device disclosed in Japanese Laid-Open Patent Application No.6-215513 which was filed by the applicant of the present application and was laid open.

Figure 1:
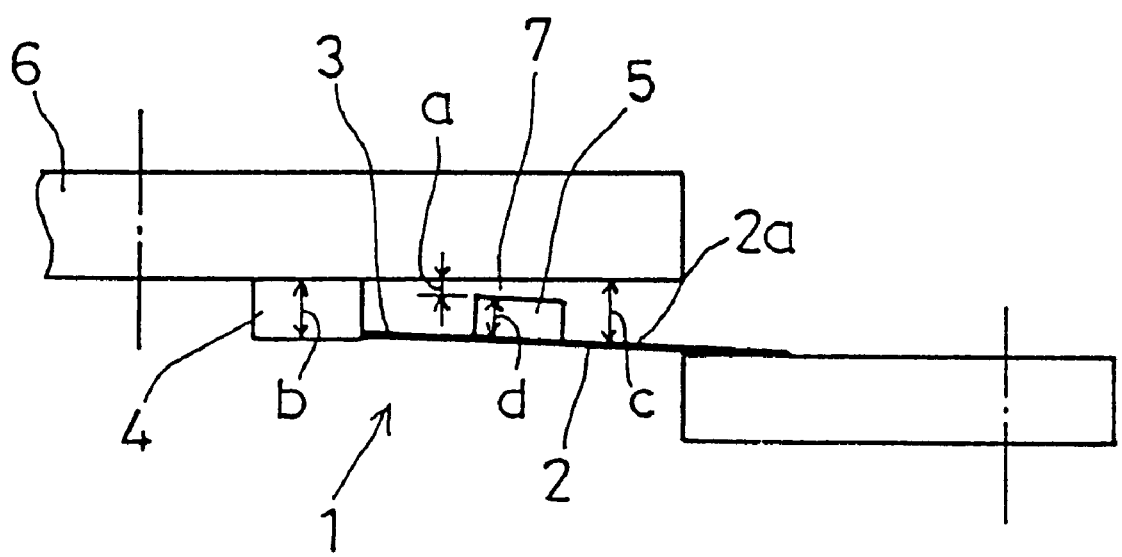
FIG. 1 is used for discussing a case where a head IC is loaded on a top surface of a suspension in a magnetic head slider supporting device which is disclosed in a Japanese patent application filed by the applicant of the present application.
Figure 3A:
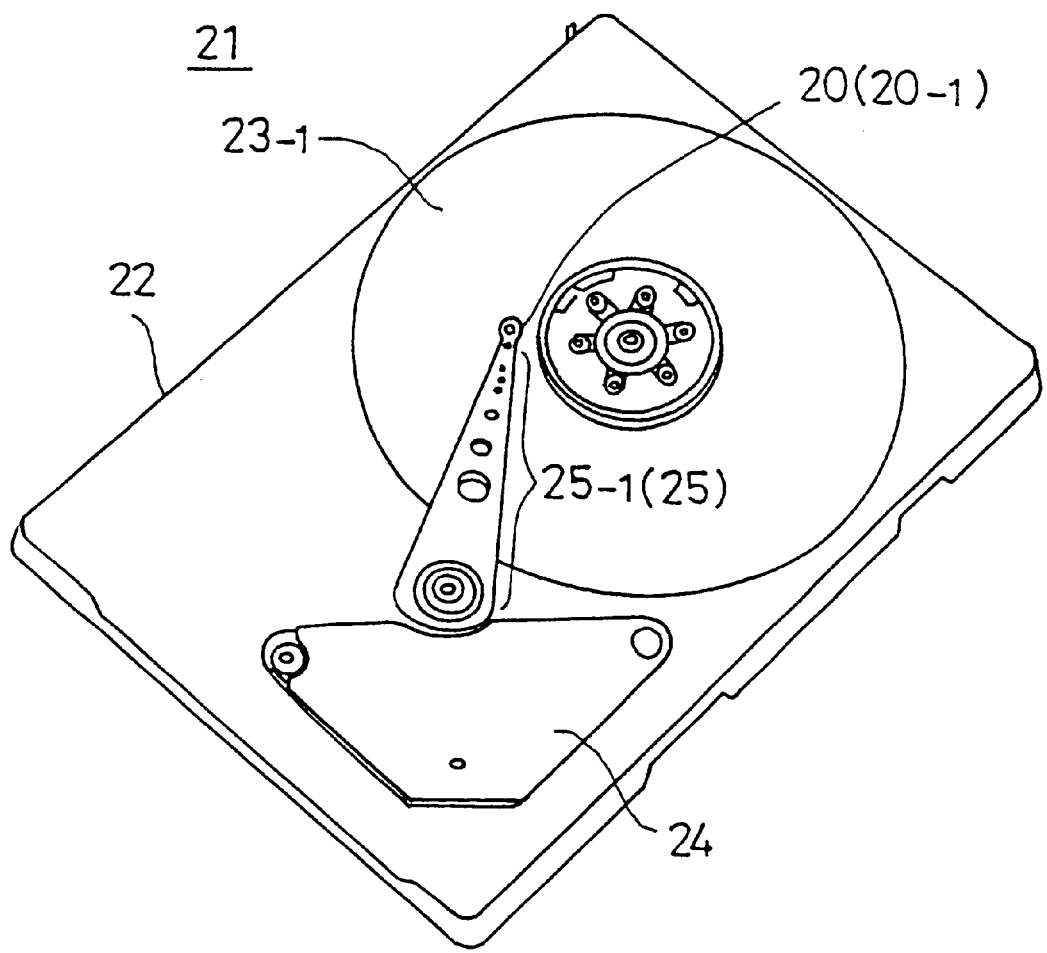
FIGS. 3A and 3B show a magnetic disk device in which the magnetic head slider supporting device shown in FIG. 1 is used.
Figure 3B:
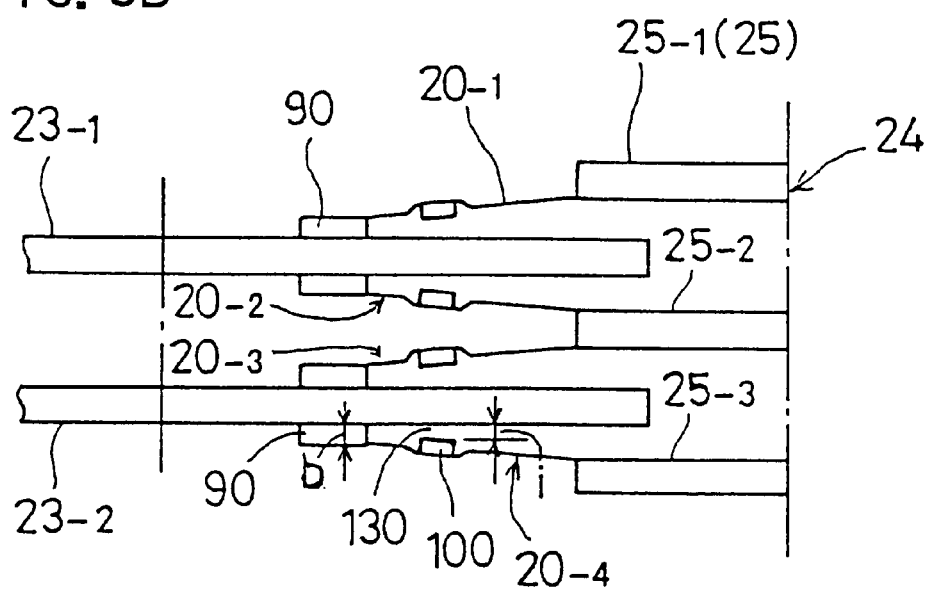

FIG. 2 shows a magnetic head slider supporting device 20 in a first embodiment of the present invention. FIGS. 3A and 3B show a magnetic disk device 21 having the magnetic head slider supporting device 20 shown in FIG. 2.

The magnetic disk device 21 has an arrangement in which two rotating magnetic disks 23-1, 23-2, an actuator 24 which has a coil and a permanent magnet and is driven electromagnetically, arms 25-1, 25-2, 25-3 which are rotated by the actuator 24, and the magnetic head slider supporting devices 20-1, 20-2, 20-3 and 20-4 which are fixed to the extending ends of the arms 25-1, 25-2 and 25-3, respectively, are contained in a housing 22. The magnetic disks 23-1 and 23-2 rotate, the actuator 24 is driven, the arms 25-1, 25-2 and 25-3 are rotated, the magnetic head slider supporting devices 20-1, 20-2, 20-3 and 20-4 are moved integrally with the arms 25-1, 25-2 and 25-3, and magnetic head sliders 90 loaded on the extending ends of the magnetic head slider supporting devices 20-1, 20-2, 20-3 and 20-4, respectively, access predetermined tracks of the magnetic disks 23-1 and 23-2, respectively, so that information recording on and information reproducing from the magnetic disks 23-1 and 23-2 are performed.

The magnetic head slider supporting devices 20-1, 20-2, 20-3 and 20-4 have arrangements the same as each other, and a reference numeral 20 is used for indicating one of these magnetic head slider supporting devices.

As shown in FIG. 2, the magnetic head slider supporting device 20 includes a suspension 30, a junction member (spacer) 80, the magnetic head slider 90, a bare head IC chip 100, and a flexible printed-circuit board 110 for wiring.

Respective members which constitute the magnetic head slider supporting device 20 will now be described. First, descriptions for the suspension 30 will now be made. The suspension 30 is made of a stainless steel plate having a thickness of 20 µm. The suspension 30 has a magnetic head slider loading portion 31, having a gimbal structure, at the extending end (X1 side) thereof, a fixing portion 32, which is fixed on the junction member 80, at the fixed end (X2 side) of the suspension 30, a rigid portion 33, which has rigidity and does not bend, continuing to the magnetic head slider loading portion 31, and an elastically bending portion 34, which elastically bends, extending between the rigid portion 33 and the fixing portion 32. The suspension 30 has a tongue portion 35 which is bent at a right angle along the longitudinal direction of the suspension 30 at one side of the fixing portion 32. Two openings 36, 38 and two slits 39, 40 are formed in the suspension 30. The slits 39, 40 are formed in and are in parallel with a longitudinal direction of the elastically bending portion 34 so that the elastically bending portion 34 elastically bends easily. The rigidity of the rigid portion 33 is provided by rib portions 41 formed as a result of being bent downwardly at both sides of the width direction of the suspension 30 (see FIGS. 4 and 4B).

As will described later, on the top surface 30a of the suspension 30, a plurality of copper-made wiring patterns 42a, 43a, 44a, 45a, 42b, 43b, 44b and 45b are formed for signal transmission.

Figure 5:
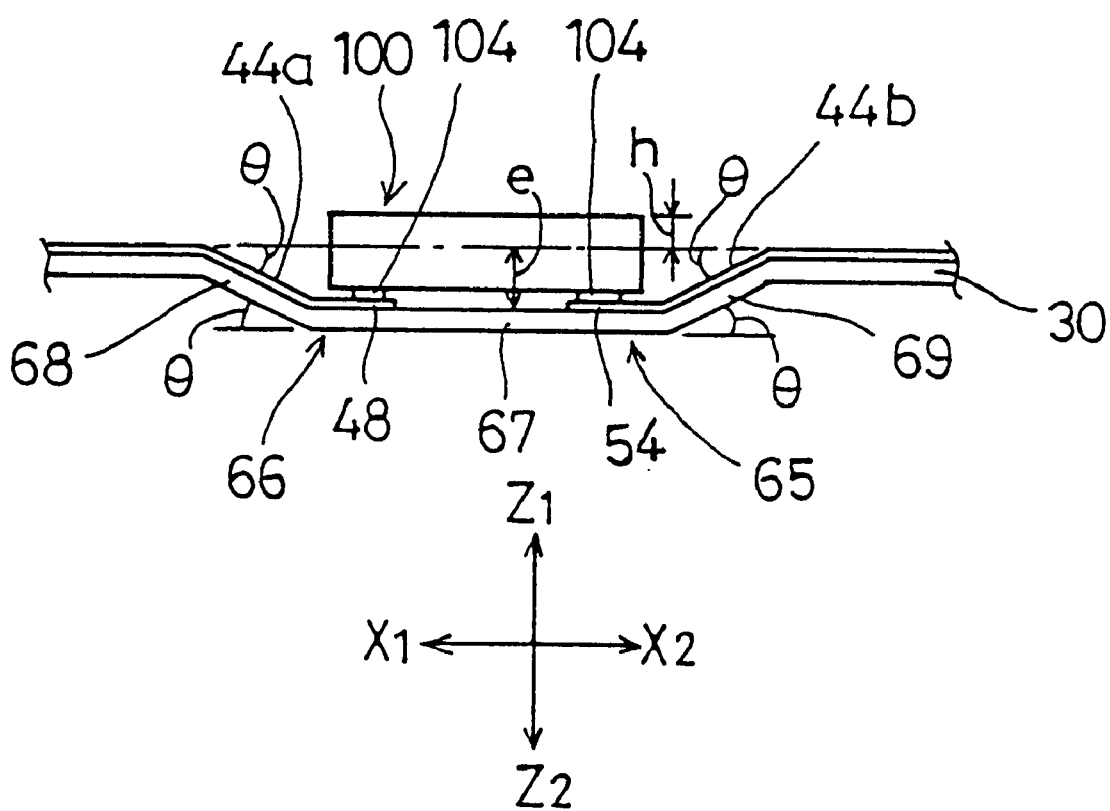
FIG. 5 shows a side elevational sectional view taken along a line V—V of FIG. 4.

As shown in FIGS. 4 and 5, after magnification, a bare head IC chip mounting portion 65 is formed in the rigid portion 33 of the suspension 30, on the top surface 30a and on the center line of the suspension 30, on the fixed-end side (X2 side) of the opening 36.

The bare head IC chip mounting portion 65 has a reverse trapezoid shape as shown in FIG. 5, as a result of both end sides of a belt-shape portion 66 (shown in FIG. 5), extending along the longitudinal direction of the suspension 30, being cut, and the belt-shape portion 66 being pressed downward, by a pressing machine. Thus, the bare head IC chip mounting portion 65 is formed so as to form a depressed shape in the suspension 30.

In detail, the bare head IC chip mounting portion 65 has a bare head IC chip supporting surface portion 67, having the plan-view size of the bare head IC chip 100, positioned lower than the top surface 30a of the suspension 30 by a depth 'e', in parallel with the top surface 30a of the suspension 30; a first slope portion 68 jointing the X1-direction end of the bare head IC chip mounting portion 65 with the top surface 30a of the suspension 30; and a second slope portion 69 jointing the X2-direction end of the bare head IC chip mounting portion 65 with the top surface 30a of the suspension 30. There are cut portions 70 and 71 (shown in FIG. 4B), which extend in the longitudinal direction (X1, X2 directions) of the suspension 30. The above-mentioned depth 'e' is, for example, 0.2 mm.

Electrically, as shown in FIG. 4B, minute pad terminals 46, 47, 48 and 49 are formed to be arranged in the Y1, Y2 directions at the X1-direction end of the bare head IC chip supporting surface portion 67. Similarly, minute pad terminals 52, 53, 54 and 55 are formed to be arranged in the Y1, Y2 directions at the X2-direction end of the bare head IC chip supporting surface portion 67. First wiring patterns 42a, 43a, 44a and 45a extend from the minute pad terminals 46, 47, 48 and 49, respectively, rise on the first slope portion 68 and reach the top surface 30a of the suspension 30. Second wiring patterns 42b, 43b, 44b and 45b extend from the minute pad terminals 52, 53, 54 and 55, respectively, rise on the second slope portion 69 and reach the top surface 30a of the suspension 30.

As shown in FIG. 2, the first wiring patterns 42a, 43a, 44a and 45a extend from the magnetic head slider loading portion 31 in the X2 direction, pass along both sides of the opening 36, and reach the bare head IC chip mounting portion 65. The second wiring patterns 42b, 43b, 44b and 45b extend in the X2 direction from the bare head IC chip mounting portion 65, pass between the slits 39 and 40, reach the tongue portion 35 and are terminated to form pad terminals 56, 57, 58 and 59.

As shown in FIG. 2, the wiring patterns 42a, 43a, 44a, 45a, 42b, 43b, 44b and 45b are formed on a base layer 50 made of polyimide on the top surface 30a of the suspension 30, and, also, are covered by a covering layer 51 so that these wiring patterns are protected by these layers. Because the distance L between the magnetic head slider loading portion 31 and the bare head IC chip mounting portion 65 is approximately 3 mm and thus is short, the length of the first wiring patterns 42a, 43a, 44a and 45a is approximately 3 mm and is thus short. Thereby, the inductances of the first wiring patterns 42a, 43a, 44a and 45a are small. Further, the electrostatic capacities between adjacent first wiring patterns 42a, 43a, 44a and 45a are small.

A portion including the pad terminals 56, 57, 58 and 59 of the tongue portion 35 constitutes a flexible printed-circuit board connection prearranged portion 79.

Features of the bare head IC chip mounting portion 65 will now be further described.

1) The bare head IC chip mounting portion 65 is formed in the rigid portion 33 of the suspension 30 on the top surface 30a thereof. Accordingly, when the bare head IC chip mounting portion 65 is formed there, the characteristics of the suspension 30 are not influenced thereby.

2) The bare head IC chip mounting portion 65 is formed as a result of the portions of the suspension 30 being cut and the belt-shape portion 66 between these cut portions 70 and 71 being bent so that the reverse trapezoid shape is formed. That is, the bare head IC chip mounting portion 65 is formed without drawing the suspension 30. Accordingly, the bare head IC chip mounting portion 65 is formed without an excessive stress being applied to the suspension 30. In other words, the bare head IC chip mounting portion 65 is formed without the characteristics of the suspension 30 being influenced thereby.

3) The cut portions 70 and 71 extend in the longitudinal direction of the suspension 30 (X1, X2 directions). Accordingly, the bare head IC chip mounting portion 65 is formed without the characteristics of the suspension 30 being influenced thereby.

4) With reference to FIG. 5, each of the angle θ between the plane extending from the top surface 30a of the suspension 30 and the first slope portion 68, the angle θ between the plane extending from the top surface 30a of the suspension 30 and the second slope portion 69, the angle θ between the plane extending from the bare head IC chip supporting surface angle θ between the plane extending from the bare head IC chip supporting surface portion 67 and the second slope portion 69 is on the order of 30 degrees. Accordingly, with reference to FIG. 4B, bending is gentle at each of the position 75 at which the first wiring patterns 42a, 43a, 44a and 45a extend from the top surface 30a of the suspension 30 to the first slope portion 68, the position 76 at which the first wiring patterns 42a, 43a, 44a and 45a extend from the first slope portion 68 to the bare head IC chip supporting surface portion 67, the position 77 at which the second wiring patterns 42b, 43b, 44b and 45b extend from the bare head IC chip supporting surface portion 67 to the second slope portion 69, and the position 78 at which the second wiring patterns 42b, 43b, 44b and 45b extend from the second slope portion 69 to the top surface 30a of the suspension 30. Thereby, cutoffs of these wiring patterns at these positions 75, 76, 77 and 78 can be prevented.

Descriptions for the junction member 80 will now be made. The junction member 80 is made of a stainless steel plate having a thickness of 0.25 mm, has a suspension fixing portion 81 on the extending end side (X1 side) thereof and has a fixing portion 82 on the fixed end side (X2 side) thereof for fixing the junction member 80 to the arm 25, as shown in FIG. 2. The suspension fixing portion 81 has a projection 83 and the fixing portion 82 has a hole 84 for staking. The junction member 80 is used for fixing the suspension 30 to the arm 25, that is, the junction member 80 is used for fixing the magnetic head slider supporting device 20 to the arm 25.

Descriptions for the magnetic head slider 90 will now be made. The magnetic head slider 90 is a so-called pico-slider, and has the height 'b' of 0.3 mm. As shown in FIG. 2, a head 92 (consisting of an inductance head for recording and a head for reproducing using a magneto-resistance effect element or a giant magneto-resistance effect element) is formed on an end surface 91 of the magnetic head slider 90 through thin film forming. The magnetic head slider 90 further has two wiring patterns (not shown in FIG. 2), drawn from each head, and terminals 93 which are the extending ends of these wiring patterns.

Descriptions for the bare head IC chip 100 will now be made. As shown in FIG. 4A, an integrated circuit 102 is formed on the bottom surface 101 of the bare head IC chip 100. The integrated circuit 102 is covered by a protection film and minute bumps 104 are aligned on the bottom surface 101. The arrangement of the minute bumps corresponds to the arrangement of the minute pad terminals 46, 47, 48, 49, 52, 53, 54 and 55. The integrated circuit 102 includes a circuit for amplifying the signal reproduced through the head 92. The width 'f' of the bare head IC chip 100 is, for example, slightly shorter than 1 mm, and thus the bare head IC chip 100 is very short in comparison to a head IC in the related art, which is sealed by synthetic resin, having the width of 5 mm. The thickness 'g' of the bare head IC chip 100 is, for example, 0.3 mm, and thus the bare head IC chip 100 is very thin in comparison to the head IC in the related art, which is sealed by synthetic resin, having the thickness of 2 mm. The weight of the bare head IC chip 100 is 0.5 mg, and thus, the bare head IC chip 100 is very light in comparison to the head IC in the related art, which is sealed by synthetic resin, having the weight of 10 mg.

Descriptions for the flexible printed-circuit board 110 will now be made. The flexible printed-circuit board 110 is a belt-shape member having a width on the order of 1 mm, has four wiring patterns extending in the X1, X2 directions and has four pad terminals 115, 116, 117 and 118 at the extending end of these wiring patterns, as shown in FIG. 2.

The arrangement of the magnetic head slider supporting device 20 will now be described.

As shown in FIG. 2, positioning of the suspension 30 is performed as a result of the projection 83 being caused to fit into the opening 38, and the fixing portion 32 of the suspension 30 is fixed on the suspension fixing portion 81 of the junction member 80 through welding or the like. The tongue portion 35 is positioned at a side wall side of the junction member 80. The elastically bending portion 34 extends from the junction member 80 in the X1 direction. The magnetic head slider 90 is adhered to the magnetic head slider loading portion 31, thus being loaded and supported thereon. Each of the terminals 93 of the magnetic head slider 90 is connected with a respective one of pad terminals 95, which are the ends of the first wiring patterns 42a, 43a, 44a and 45a, through thermocompression of a respective one of Au balls 94.

The minute bumps 104 of the bare head IC chip 100 are connected with the minute pad terminals 46, 47, 48, 49, 52, 53, 54 and 55, respectively, through the facedown flip chip method. The bare head IC chip 100 is mounted on the bare head IC chip mounting portion 65 of the suspension 30 through thermocompression, ultrasonic waves or adhesion. The bare head IC chip 100 is mounted on the bare head IC chip supporting surface portion 67, and is positioned on the surface having the depth 'e' with respect to the top surface 30a of the suspension 30, as shown in FIG. 5. As a result, the height 'h' by which the bare head IC chip 100 protrudes from the top surface 30a of the suspension 30 is approximately 0.1 mm, which is small.

The pad terminals 115, 116, 117 and 118 of the flexible printed-circuit board 110 are connected with the pad terminals 56, 57, 58 and 59, respectively. Thus, the flexible printed-circuit board 110 is connected with the flexible printed-circuit board connection prearranged portion 79 of the tongue portion 35 and extends in the X2 direction.

The above-described magnetic head slider supporting device 20 is fixed to the extending end of the arm 25 as a result of the hole 84 for staking of the fixing portion 82 of the junction member 80 being used, and thus, extends in the axis direction of the arm 25 from the extending end of the arm 25 in the X1 direction.

The other end of the flexible printed-circuit board 110 is connected with a circuit board (not shown in the figures) of the magnetic disk device 21, and is connected with a main IC 120 which is sealed by synthetic resin and mounted on the above-mentioned circuit board. The main IC 120 includes a recording and reproducing circuit, an amplifying circuit and so forth.

Each of the other magnetic head slider supporting devices in the magnetic disk device 21 has an arrangement the same as the above-described magnetic head slider supporting device 20.

The other end of the flexible printed-circuit board of each of the other magnetic head slider supporting devices in the magnetic disk device 21 is also connected with the main IC 120.

FIGS. 3A and 3B show the magnetic disk device 21 in which the above-described magnetic head slider supporting devices 20 (20-1, 20-2, 20-3 and 20-4) are incorporated. FIG. 3B shows the state in which the bare head IC chips 100 are mounted and the spatial relationship between the mounted bare head IC chips 100 and the magnetic disks 23-1, 23-2. A gap 130 of the distance 'i' which is approximately 0.2 mm is provided between each of the mounted bare head IC chips 100 and a respective one of the magnetic disks 23-1, 23-2.

the magnetic head slider supporting device 20 (magnetic disk device 21) having the above-described arrangement has the following advantages.

1) The bare head IC chip 100 is mounted in the condition where the bare head IC chip 100 is positioned on the surface having the depth 'e' with respect to the top surface 30a of the suspension 30. Thereby, even in the case where the so-called pico-slider is used as the magnetic head slider 90, the gap 130 of the distance 'i' which is approximately 0.2 mm can be provided between each of the mounted bare head IC chips 100 and a respective one of the magnetic disks 23-1, 23-2. As a result, when a strong shock is applied to the magnetic disk device 21, the bare head IC chips 100 are prevented from coming into contact with the magnetic disks 23-1, 23-2.

2) The length of each of the first wiring patterns 42a, 43a, 44a and 45a is approximately 3 mm and thus each wiring pattern is short. As a result, the inductances of the first wiring patterns 42a, 43a, 44a and 45a are small. Further, the electrostatic capacities between adjacent first wiring patterns 42a, 43a, 44a and 45a are small. Therefore, the magnetic disk device 21 can write and read a signal of, for example, 100 MHz, higher than 70 MHz, as in the case of the related art.

3) The weight of the bare head IC chip 100 is 0.5 mg and thus the bare head IC chip 100 is light. Therefore, the influence of each of the bare head IC chips 100, mounted on a respective one of the top surfaces 30a of the suspensions 30, on the contact pressure of a respective one of the magnetic head sliders 90 onto a respective one of the magnetic disks 23-1, 23-2 is slight. Thereby, the stability of floating of each of the magnetic head sliders 20 above a respective one of the magnetic disks 23-1, 23-2 is kept well, and, also, when a strong shock is applied to the magnetic disk device 21 and thereby a head crash occurs, that is, the magnetic head sliders 90 come into contact with the magnetic disks 23-1, 23-2, the energy of the head crash can be limited to be small.

4) Because the bare head IC chip mounting portion 65 does not affect the characteristics of the suspension 30, each of the magnetic head sliders 90 floats above a respective one of the magnetic disks 23-1, 23-2 stably.

A magnetic head slider supporting device in a second embodiment of the present invention will now be described.

Figure 6:
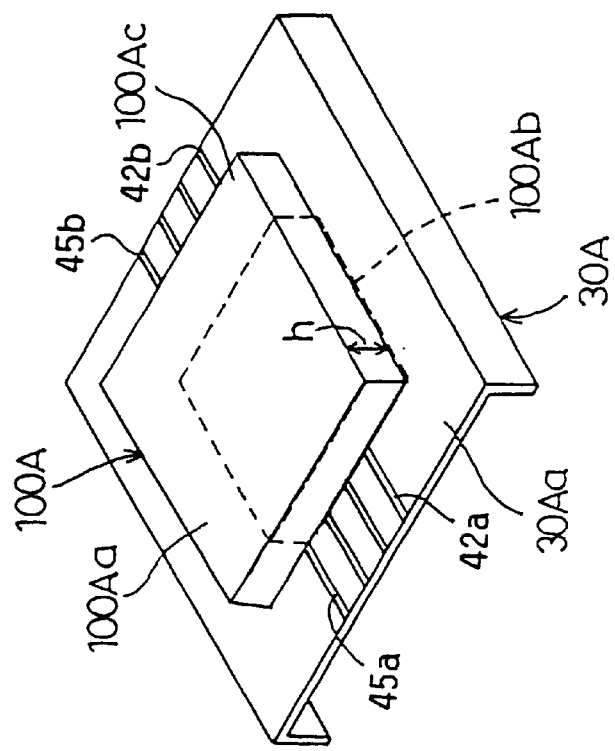
FIGS. 6, 6A and 6B show a structure of a portion at which the head IC chip is mounted in a magnetic head slider supporting device in a second embodiment of the present invention.
Figure 6A:
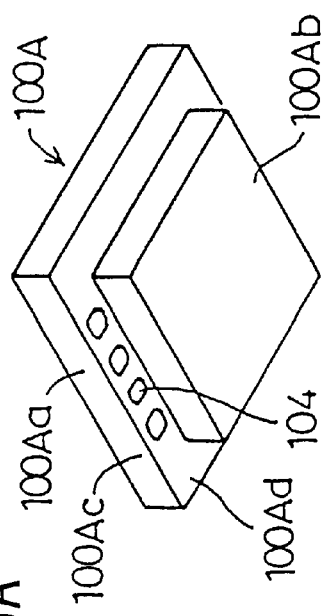
Figure 6B:
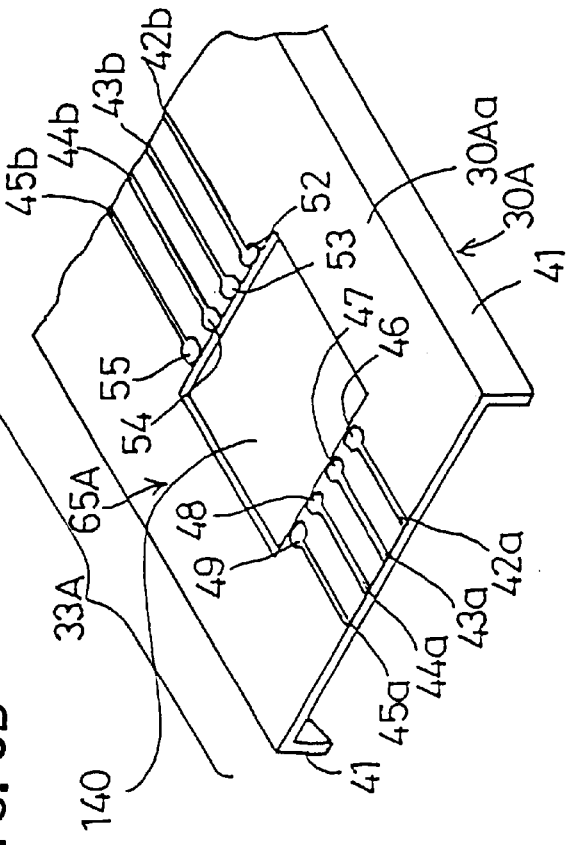

FIGS. 6, 6A and 6B show, after magnification, a portion of the magnetic head slider supporting device in the second embodiment of the present invention. For the parts/components identical to those shown in FIGS. 4, 4A and 4B, the same reference numerals are given, respectively. For the parts/components corresponding to those shown in FIGS. 4, 4A and 4B, the same reference numerals with the suffix 'A' are given, respectively. Except for the portion shown in FIGS. 6, 6A and 6B, the magnetic head slider supporting device in the second embodiment has a structure the same as that of the magnetic head slider supporting device 20 in the first embodiment shown in FIG. 2. Therefore, a figure and description thereof will be omitted.

As a result of the lower half peripheral portion of a bare head IC chip 100A being, for example, cut out, the size of the upper half portion 100Aa of the bare head IC chip 100A is larger than the size of the lower half portion 100Ab of the bare head IC chip portion 100A, as shown in FIG. 6A. Thus, the upper half portion 100Aa has an extending portion 100Ac which extends around and above the lower half portion 100Ab. The bare head IC chip 100A has the plurality of minute bumps 104, arranged side by side, on the bottom surface 100Ad of the extending portion 100Ac.

As shown in FIG. 6B, a are head IC chip mounting portion 65A has an opening 140 having a size corresponding to the size of the lower half portion 100Ab of the bare head IC chip 100A. Further, along the periphery of the opening 140, the minute pad terminals 46, 47, 48, 49, 52, 53, 54 and 55 are arranged side by side. This bare head IC chip mounting portion 65A is provided in a rigid portion 33A of a suspension 30A, on a top surface 30Aa thereof.

When the bare head IC chip 100A is mounted on the bare head IC chip mounting portion 65A, the extending portion 100Ac is supported by the peripheral edge of the opening 140, and the lower half portion 100Ab fits into the opening 140. Thus, the lower half portion 100Ab is positioned lower than the top surface 30Aa of the suspension 30A, and only the upper half portion 100Aa is positioned higher than the top surface 30Aa of the suspension 30A. Because the extending portion 100Ac is supported by the peripheral edge of the opening 140, only by causing the lower half portion 100Ab to fit into the opening 140, the state in which the lower half of the bare head IC chip 100A is positioned lower than the top surface 30Aa of the suspension 30A is provided, without performing a special positioning operation.

The minute bumps 104 on the bottom surface 100Ad of the extending portion 104Ac are electrically connected with the minute pad terminals 46, 47, 48, 49, 52, 53, 54 and 55, respectively, through soldering. As a result of the lower half portion 100Ab fitting into the opening 140, the bare head IC chip 100A is precisely positioned with respect to the bare head IC chip mounting portion 65A. As a result, the minute bumps 104 face the minute pad terminals 46, 47, 48, 49, 52, 53, 54 and 55, respectively, precisely. As a result, each of the minute bumps 104 and a respective one of the minute pad terminals 46, 47, 48, 49, 52, 53, 54 and 55 are connected with one another with high reliability.

FIGS. 7, 7A and 7B show, after magnification, a portion of a magnetic head slider supporting device in a third embodiment of the present invention. For the parts/components identical to those shown in FIGS. 4, 4A and 4B, the same reference numerals are given, respectively. For the parts/components corresponding to those shown in FIGS. 4, 4A and 4B, the same reference numerals with the suffix 'B' are given, respectively. Except for the portion shown in FIGS. 7, 7A and 7B, the magnetic head slider supporting device in the third embodiment has a structure the same as that of the magnetic head slider supporting device 20 in the first embodiment shown in FIG. 2. Therefore, a figure and description thereof will be omitted.

As shown in FIG. 7A, the plurality of minute bumps 104 are arranged side by side on a side wall 100Ba of a bare head IC chip 100B, in the upper half portion thereof. Similarly, the plurality of minute bumps 104 (not shown in the figures) are arranged side by side also on a side wall 100Bb of the bare head IC chip 100B, which side wall 100Bb is opposite to the side wall 100Ba, in the upper half portion thereof.

As shown in FIG. 7B, a bare head IC chip mounting portion 65B has an opening 150 having a size corresponding to the size of the bare head IC chip 100B. Further, along the periphery of the opening 150, the minute pad terminals 46, 47, 48, 49, 52, 53, 54 and 55 are arranged side by side. This bare head IC chip mounting portion 65B is provided in a rigid portion 33B of a suspension 30B, on a top surface 30Ba thereof.

The lower half portion of the bare head IC chip 100B is inserted into the opening 150 and, thus, a state in which the lower half portion of the bare head IC chip 100B is positioned lower than the top surface 30Ba of the suspension 30B is provided. In this state, each of the minute bumps 104 on the side walls 100Ba, 100Bb is electrically connected with a respective one of the minute pad terminals 46, 47, 48, 49, 52, 53, 54 and 55 arranged along the periphery of the opening 150, through thermocompression of a respective one of Au balls 151, as shown in FIG. 7. Thus, the bare head IC chip 100B is fixed to the suspension 30B through the thermocompression of the Au balls 151.

In each of fourth, fifth and sixth embodiments, which will now be described, a bare head IC chip mounting portion is provided on a suspension at a portion fixed to a junction member, which portion is located at a fixed-end side of the suspension.

Figure 8:
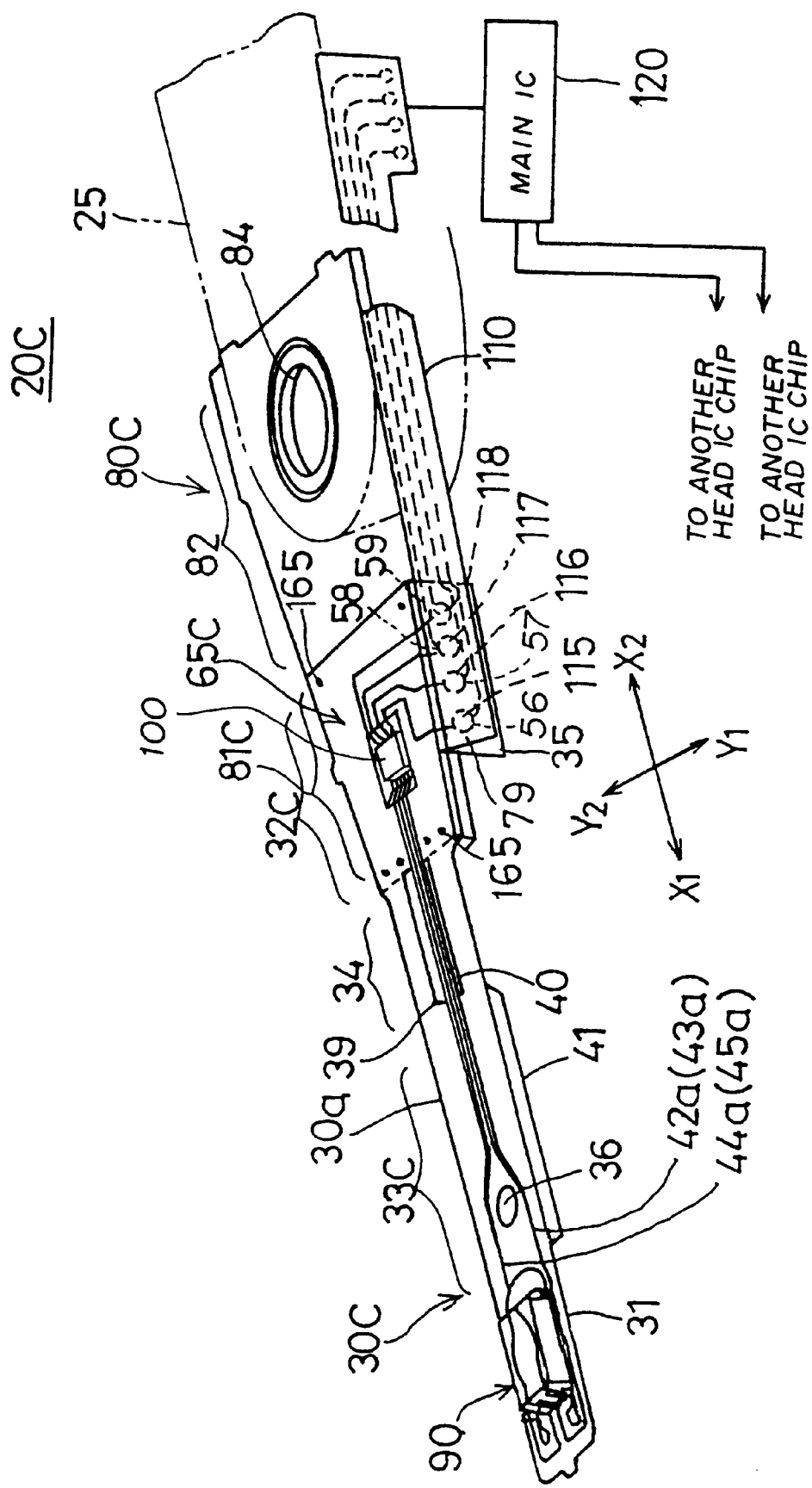
FIG. 8 shows a magnetic head slider supporting device in a fourth embodiment of the present invention.

FIG. 8 shows a magnetic head slider supporting device 20C in the fourth embodiment of the present invention. FIGS. 9, 9A, 9B, 9C and 10 show, after magnification, a portion of the magnetic head slider supporting device 20C.

In the magnetic head slider supporting device 20C, what is different from the magnetic head slider supporting device 20 shown in FIG. 2 is a bare head IC chip mounting portion 65C. The bare head IC chip mounting portion 65C is formed in a fixing portion 32C of a suspension 30C, and has a structure such that cutoffs of wiring patterns are not likely to occur. In FIGS. 8, 9, 9A, 9B, 9C and 10, the same reference numerals are given to portions the same as those shown in FIGS. 2, 4, 4A, 4B and 5, descriptions thereof being omitted, and the same reference numerals with suffix C are given to portions corresponding to those shown in FIGS. 2, 4, 4A, 4B and 5.

As shown in FIG. 8, the magnetic head slider supporting device 20C includes the suspension 30C, a junction member (spacer) 80C, a magnetic head slider 90, a bare head IC chip 100 and a flexible printed-circuit board 110 for wiring.

Figure 10:
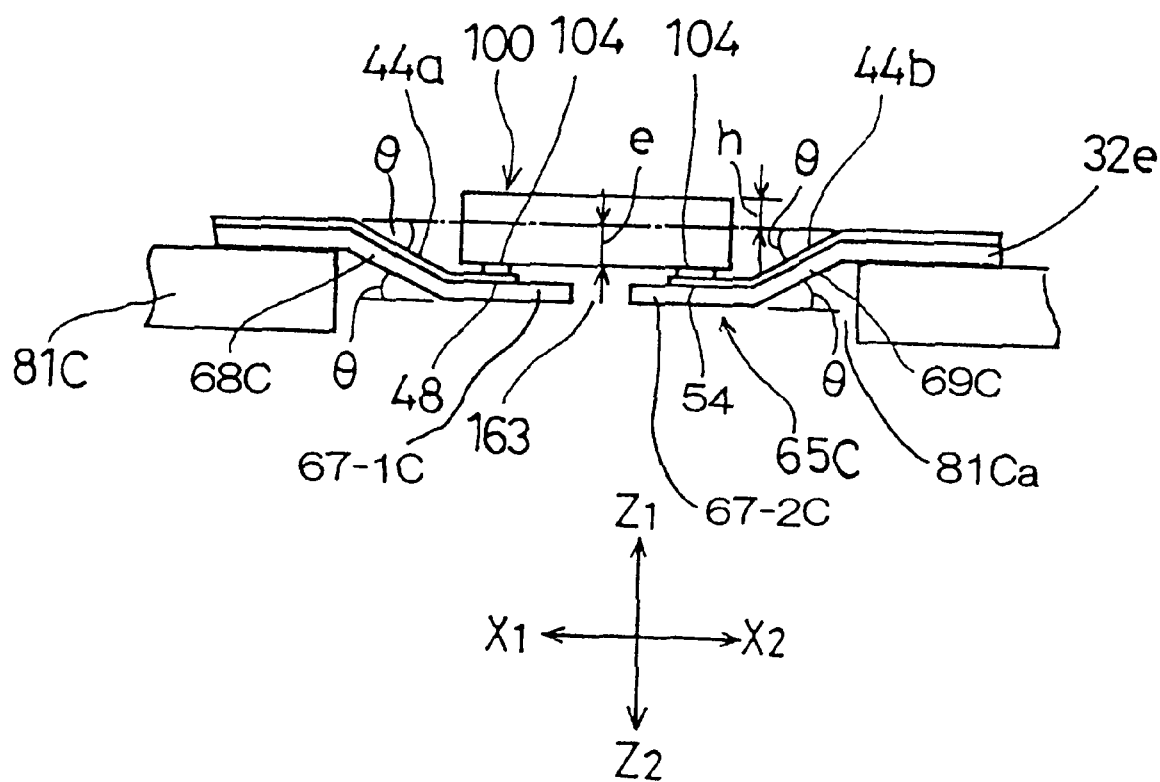
FIG. 10 shows a side elevational sectional view taken along a line X—X of FIG. 9.
Figure 11A:
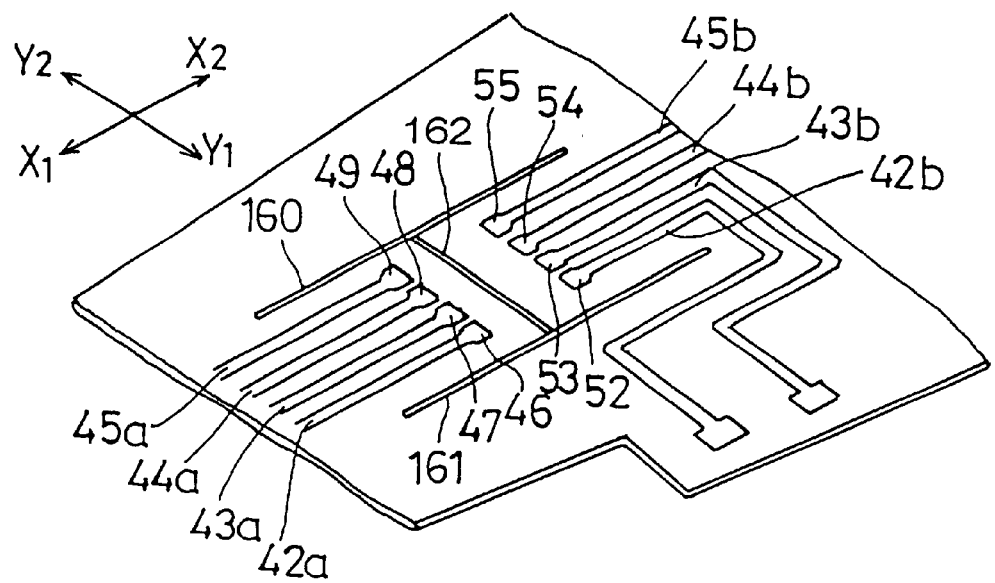
FIGS. 11A and 11B show forming of a head IC chip mounting portion of the magnetic head slider supporting device shown in FIG. 8.
Figure 11B:
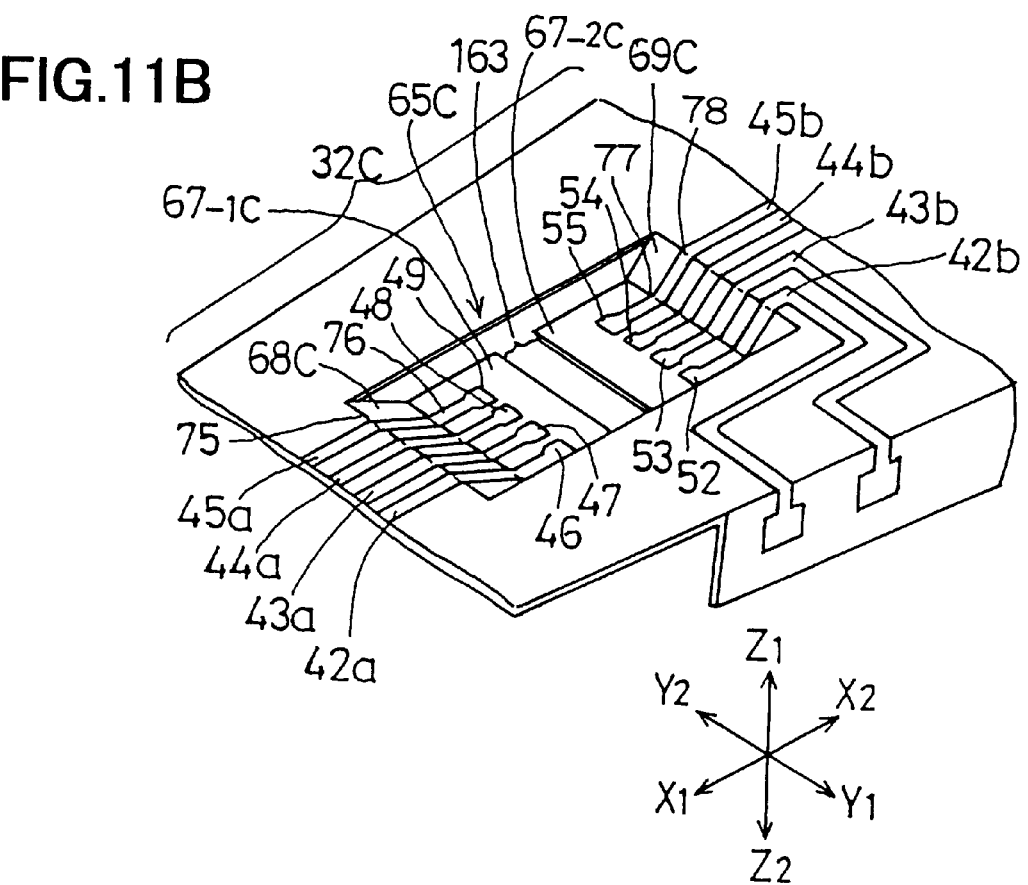

The bare head IC chip mounting portion 65C is formed in the fixing portion 32C of the suspension 30C at the fixed-end side (X2 side) thereof, which portion is fixed on the junction member 80C. The bare head IC chip mounting portion 65C is formed in the following manner: As shown in FIG. 11A, first and second wiring patterns 42a through 45a, 42b through 45b, and pad terminals 46 through 49, 52 through 55 are formed on the fixing portion 32C. In this fixing portion 32C, first, parallel slits 160 and 161 are formed along the longitudinal directions (X1, X2 directions) of the suspension 30C, and a slit 162 which extends in the Y1, Y2 directions (perpendicular to the X1, X2 directions) so as to connect the centers of the respective slits 160 and 161 is formed. (The slits 160, 161 and 162 form an H shape.) Then, by using a press machine, this portion is pressed and projects downward, so that, as shown in FIGS. 11B and 10, this portion forms a reverse trapezoid shape and forms a recession. Thus, the bare head IC chip mounting portion 65C is formed.

The bare head IC chip mounting portion 65C has a size corresponding to the size of the bare head IC chip in the plan view thereof. The bare head IC chip mounting portion 65C includes a first slope portion 68C, a second slope portion 69C, a first head IC chip supporting surface portion 67-1C and a second head IC chip supporting surface 67-2C. The first slope portion 68C is located at the X1 direction end and slopes downward from the top surface of the suspension 30C. The second slope portion 69C is located at the X2 direction end and slopes downward from the top surface of the suspension 30C. The first head IC chip supporting surface portion 67-1C extends horizontally in the X2 direction from the bottom end of the first slope portion 68C. The second head IC chip supporting surface portion 67-2C extends horizontally in the X1 direction from the bottom end of the second slope portion 69C. The first and second head IC chip supporting portions 67-1C and 67-2C extend so as to approach one another, but the extending ends of the respective ones stand apart from one another. A space 163 is formed between these extending ends.

When the portion sandwiched by the slits 160 and 161 is pressed and projects downward as mentioned above, the slit 162 spreads, and, thus, the space 163 is formed. As a result, each of the first and second slope portions 68C and 69C bends but does not lengthen. Thereby, the first and second slope portions 68C and 69C are formed without apprehension of occurrence of cutoffs of the first and second wiring patterns 42a through 45a, 42b through 45b.

A rigid portion 33C of the suspension 30C does not include such a cut, pressed and projecting portion.

With reference also to FIG. 8, the first wiring patterns 42a through 45a extend on the suspension 30C and reach the magnetic head slider 90. The second wiring patterns 42b through 45b extend to the pad terminals 56 through 59.

As shown in FIGS. 9, 9B and 10, minute bumps 104 of the bare head IC chip 100 are connected with the pad terminals 46 through 49 on the first head IC chip supporting surface portion 67-1C and with the terminals 52 through 55 on the second head IC chip supporting portion 67-2C, respectively, in the facedown flip chip method. Thus, the bare head IC chip 100 is mounted on and extends over the first and second head IC chip supporting surface portions 67-1C and 67-2C. Further, the bare head IC chip 100 is lowered from the top surface of the fixing portion 32C by a depth 'e'.

As shown in FIGS. 9, 9B, 9C and 10, an opening window 81Ca is formed in a suspension fixing portion 81C of the junction member 80C. The opening window 81Ca has a size and a shape corresponding to those of the bare head IC chip mounting portion 65C, and the bare head IC chip mounting portion 65C is inserted into the opening window 81Ca.

The fixing portion 32C of the suspension 30C is mounted on the suspension fixing portion 81C of the junction member 80C, and welding is performed at a plurality of portions 165. Thus, the suspension 30C is connected with the junction member 80C. The bare head IC chip mounting portion 65C on which the bare head IC chip 100 is mounted is contained by the opening window 81Ca, as shown in FIGS. 9 and 10.

When the above-described magnetic head slider supporting device 20C is used in a magnetic disk device, in comparison to the case where the magnetic head slider supporting device 20 shown in FIG. 2 is used, it is possible to achieve a high-accuracy, high-speed seeking operation. This is because the bare head IC chip 100 is mounted on the fixing portion 32C of the suspension 30C, and, in comparison to the case of the magnetic head slider supporting device 20 shown in FIG. 2, the bare head IC chip 100 is located at the position near to the rotation axis of the magnetic head slider supporting device 20C. Therefore, the inertia moment in the case where the magnetic head slider supporting device 20C is rotated about the rotation axis is small. Further, because no cut is formed in the rigid portion 33C, the rigid portion 33C has a high rigidity.

Figure 20:
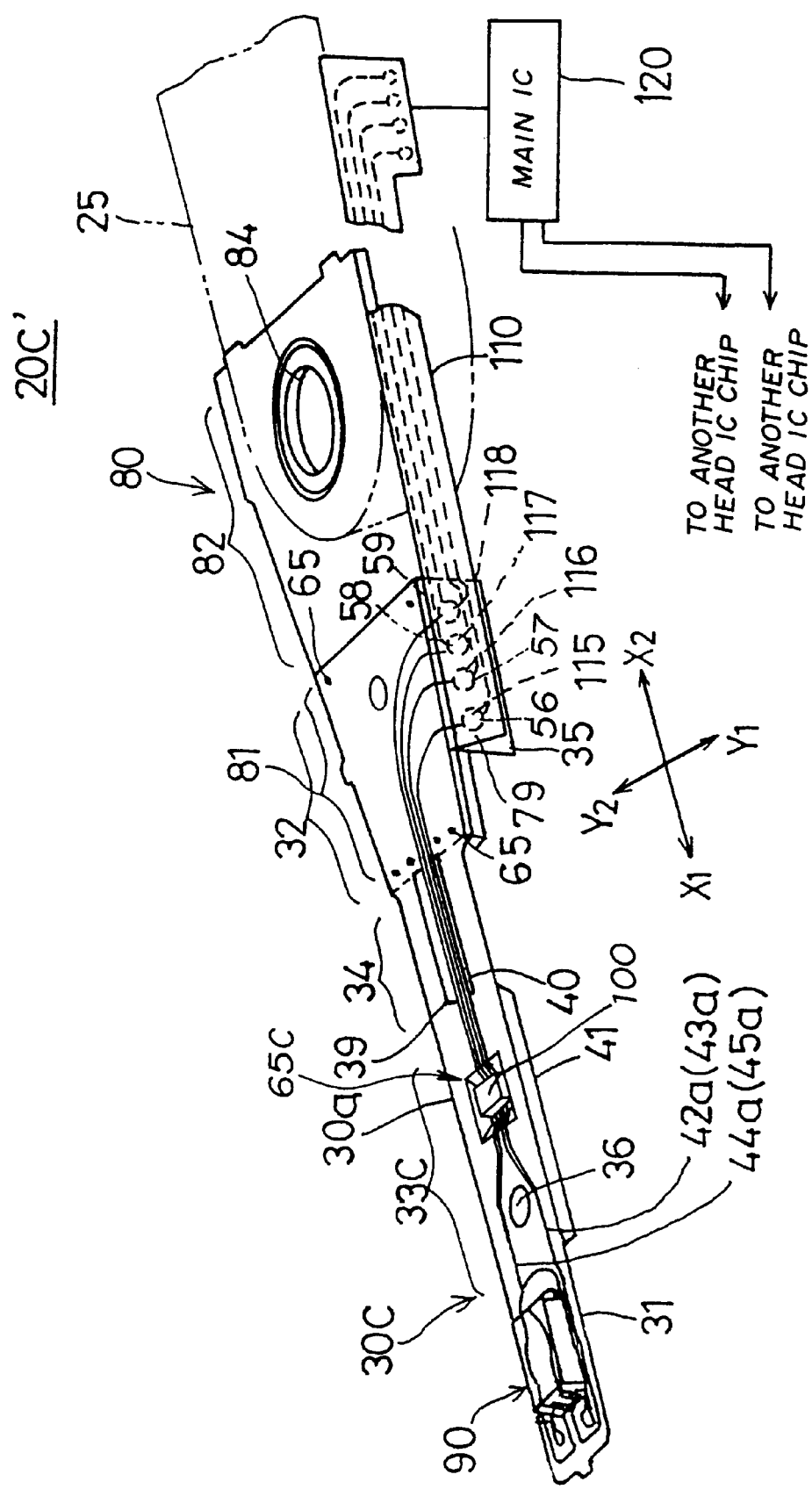
FIG. 20 shows a magnetic head slider supporting device in a seventh embodiment of the present invention.

It is also possible that the bare head IC chip mounting portion 65C is formed in the rigid portion 33C as shown in FIG. 20, as in the case of FIG. 2. Except for the bare head IC chip mounting portion 65C, the structure of a magnetic head slider supporting device 20C' shown in FIG. 20 is the same as the structure of the magnetic head slider supporting device 20 shown in FIG. 2, and a description thereof will be omitted.

Figure 12A:
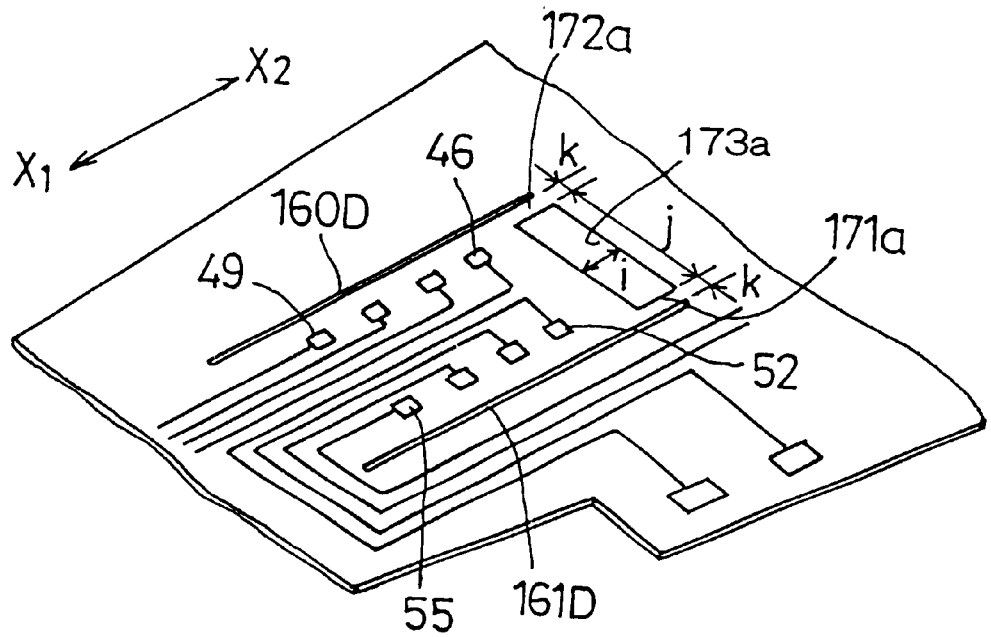
FIGS. 12A and 12B show forming of a head IC chip mounting portion of a magnetic head slider supporting device in a fifth embodiment of the present invention.
Figure 12B:
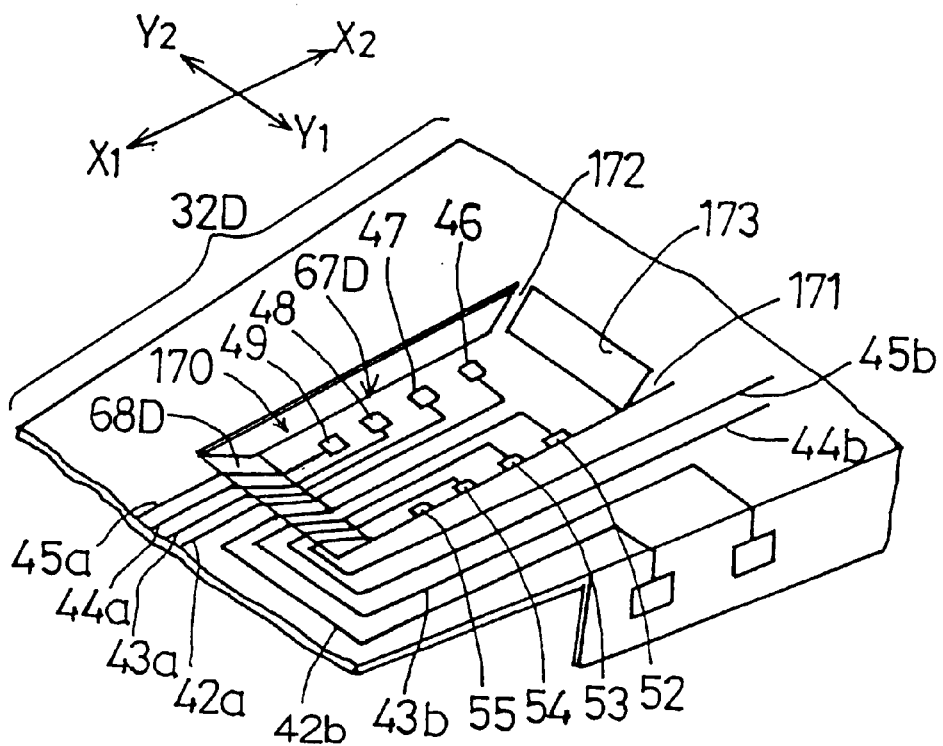
Figure 14:
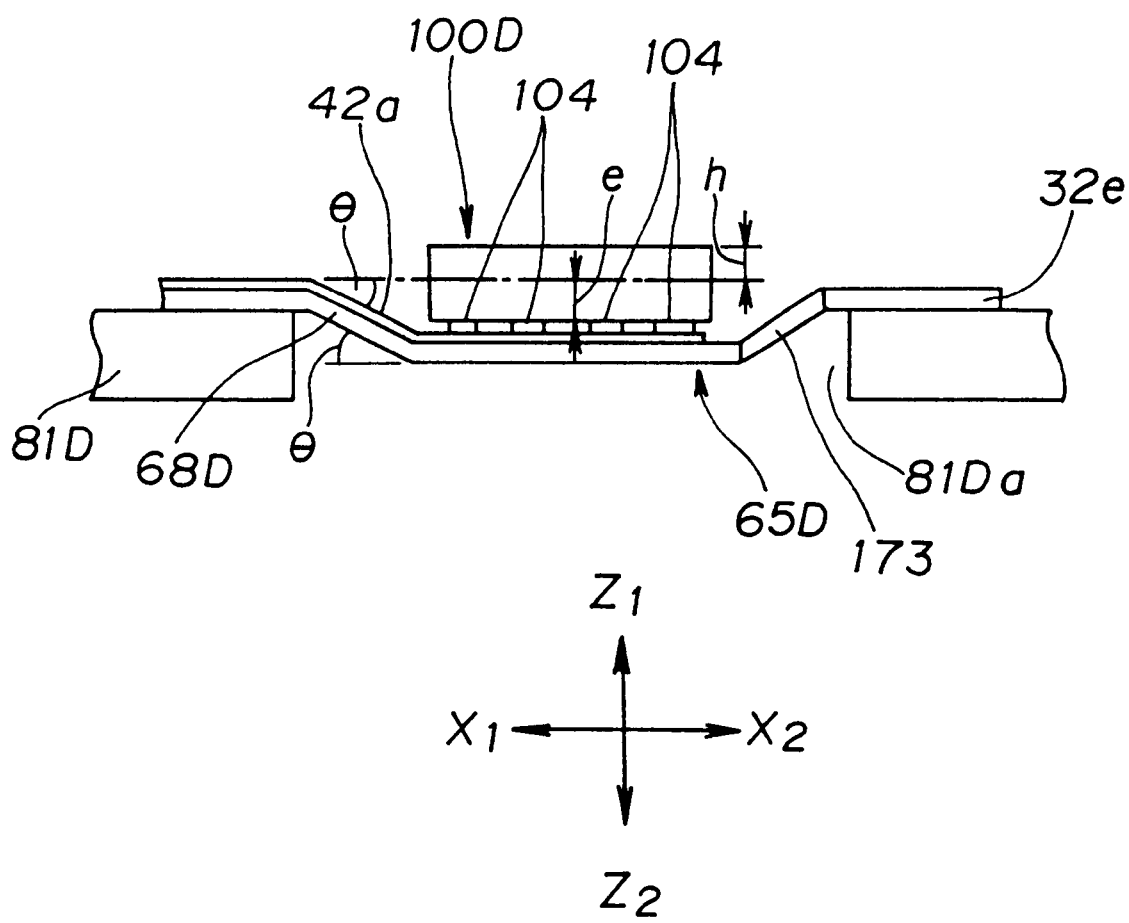
FIG. 14 shows a side elevational sectional view taken along a line XIV—XIV of FIG. 13.

FIG. 12B shows a bare head IC chip mounting portion 65D of a suspension 30D in a fifth embodiment of the present invention. This bare head IC chip mounting portion 65D is a variant example of the bare head IC chip mounting portion 65C in the fourth embodiment. The same reference numerals with suffix D are given to portions, shown in FIGS. 12A and 12B, corresponding to those shown in FIG. 4B.

As shown in FIG. 12B, the bare head IC chip mounting portion 65D includes a belt-shaped portion 170 having a reverse trapezoid shape as a result of having cuts formed at both side edges thereof and projecting downward. The belt-shaped portion 170 includes a central head IC chip supporting surface portion 67D, a slope portion 68D, thin connection portions 171 and 172, and a rectangular opening 173. The slope portion 68D is located at the X1-direction end and is connected with the top surface of the fixing portion 32D. The thin connection portions 171 and 172 are located at the X2-direction end, and, also, at the Y1 and Y2-direction ends. The rectangular opening 173 is located between the thin connection portions 171 and 172. The thin connection portions 171 and 172 are left when the opening 173 is formed.

On the head IC chip supporting surface portion 67D, pad terminals 46 through 49, 52 through 55 are formed side by side. Further, first and second wiring patterns 42a through 45a, 42b through 45b extend from the pad terminals 46 through 49, 52 through 55 to the top surface of the fixing portion 32D by way of the slope portion 68D.

The bare head IC chip mounting portion 65D is formed in the following manner: As shown in FIG. 12A, the first and second wiring patterns 42a through 45a, 42b through 45b, and the pad terminals 46 through 49, 52 through 55 are formed on the fixing portion 32D. In this fixing portion 32D, first, parallel slits 160D and 161D are formed along the longitudinal directions (X1, X2 directions) of the suspension 30D, and a rectangular opening 173a is formed. Then, by using a press machine, this portion is pressed and projects downward, so that, as shown in FIG. 12B, this portion forms a reverse trapezoid shape and forms a recession. Thus, the bare head IC chip mounting portion 65D is formed.

The rectangular opening 173a is located at the position on the X2-direction-end side of the slits 160D and 161D. The length of the opening 172a in the X1, X2 directions is 'i' and the length thereof in the Y1, Y2 directions is 'j'. Thin belt portions 171a and 172a are left at the portions inside the slits 160D and 161D. Each of the thin belt portions 171a and 172a is narrow and has a width 'k', and is long in the X1, X2 directions. When the portion sandwiched by the slits 160D and 161D is pressed and projects downward, the thin belt portions 171a and 172a become the above-mentioned connection portions 171 and 172. When the portion sandwiched by the slits 160D and 161D is pressed and projects downward, the slope portion 68D is formed as a result of bending but not lengthening at all because the thin belt portions 171a and 172a lengthen in the X1, X2 directions. Therefore, cutoffs of the first and second wiring patterns 42a through 45a, 42b through 45b do not occur.

FIGS. 13, 13A, 13B, 13C and 14 show assembling of the fixing portion 32D, in which assembling the head IC chip mounting portion 65D is formed, with a bare head IC chip 100D and a suspension fixing portion 81D of a junction member 80D. A manner of this assembling is basically the same as that of the assembling of the fixing portion 81C, in which assembling the head IC chip mounting portion 65C is formed, with the bare head IC chip 100 and the suspension fixing portion 81C of the junction member 80C, shown in FIGS. 9, 9A, 9B, 9C and 10, and a description thereof will be omitted.

Figure 15:
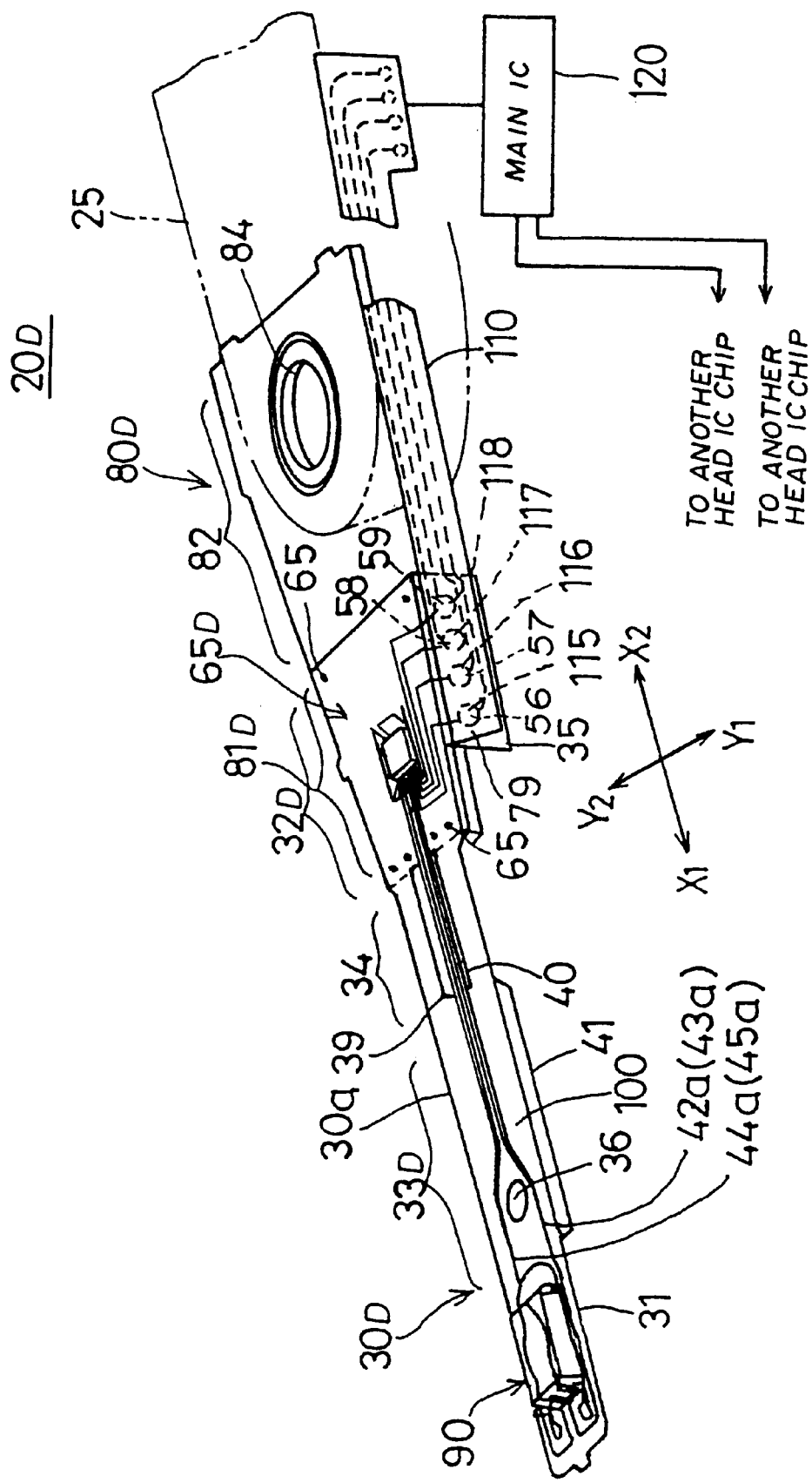
FIG. 15 shows the magnetic head slider supporting device in the fifth embodiment of the present invention.

FIG. 15 shows a magnetic head slider supporting device 20D in the fifth embodiment of the present invention including the suspension 30D which includes the head IC chip mounting portion 65D. Except for the head IC chip mounting portion 65D and the second wiring patterns 42b through 45b, the structure of the magnetic head slider supporting device 20D is the same as the magnetic head slider supporting device 20C shown in FIG. 8, and a description thereof will be omitted.

Figure 21:
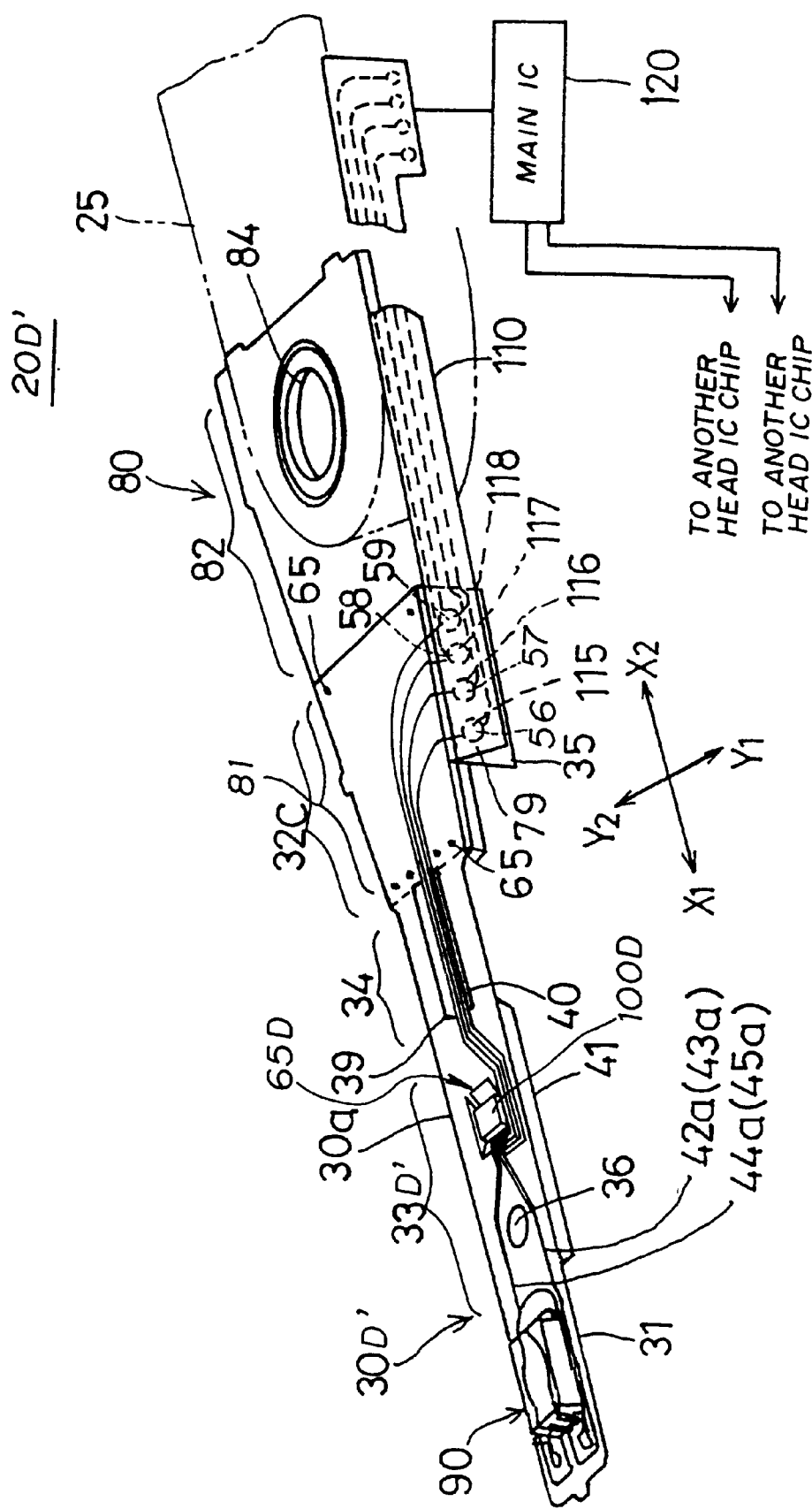
FIG. 21 shows a magnetic head slider supporting device in an eighth embodiment of the present invention.

It is possible that the above-described bare head IC chip mounting portion 65D is formed at a portion of a rigid portion 33D as shown in FIG. 21, as in the case of FIG. 2. Except for the head IC chip mounting portion 65D and the second wiring patterns 42b through 45b, the structure of a magnetic head slider supporting device 20D' shown in FIG. 21 is the same as the structure of the magnetic head slider supporting device 20 shown in FIG. 2, and a description thereof will be omitted.

Figure 16:
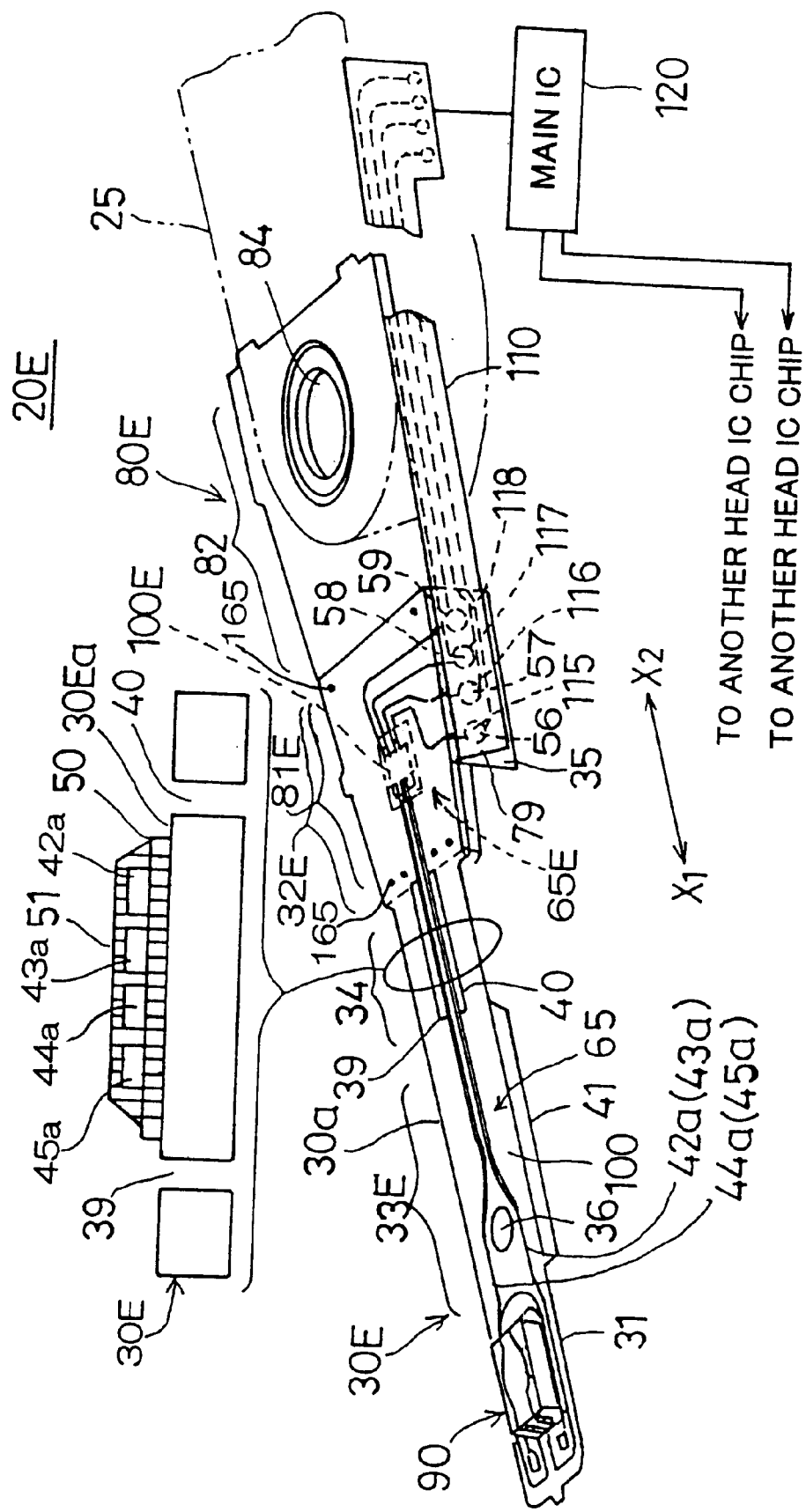
FIG. 16 shows the magnetic head slider supporting device in a sixth embodiment of the present invention.

FIG. 16 shows a magnetic head slider supporting device 20E in a sixth embodiment of the present invention. FIGS. 17, 17A, 17B, 17C and 18 show, after magnification, a portion of the magnetic head slider supporting device 20E.

In the magnetic head slider supporting device 20E, what is different from the magnetic head slider supporting device 20 shown in FIG. 2 is a bare head IC chip mounting portion 65E. The bare head IC chip mounting portion 65E is formed in a fixing portion 32E of a suspension 30E, and has a structure such that cutoffs of wiring patterns are not likely to occur. In FIGS. 16, 17, 17A, 17B, 17C, 18, 19A, 19B and 19C, the same reference numerals are given to portions the same as those shown in FIGS. 2, 4, 4A, 4B and 5, descriptions thereof being omitted, and the same reference numerals with suffix E are given to portions corresponding to portions shown in FIGS. 2, 4, 4A, 4B and 5.

As shown in FIG. 16, the magnetic head slider supporting device 20E includes the suspension 30E, a junction member (spacer) 80E, a magnetic head slider 90, a bare head IC chip 100E and a flexible printed-circuit board 110 for wiring.

Figure 19A:
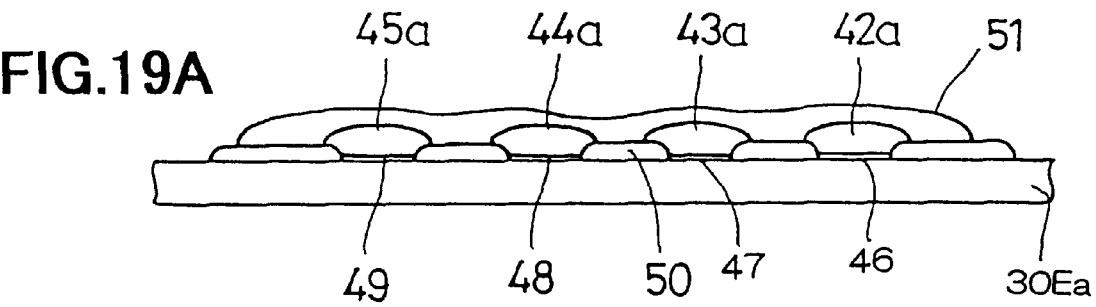
FIGS. 19A, 19B and 19C illustrate mounting of the head IC chip in the sixth embodiment of the present invention.
Figure 19B:
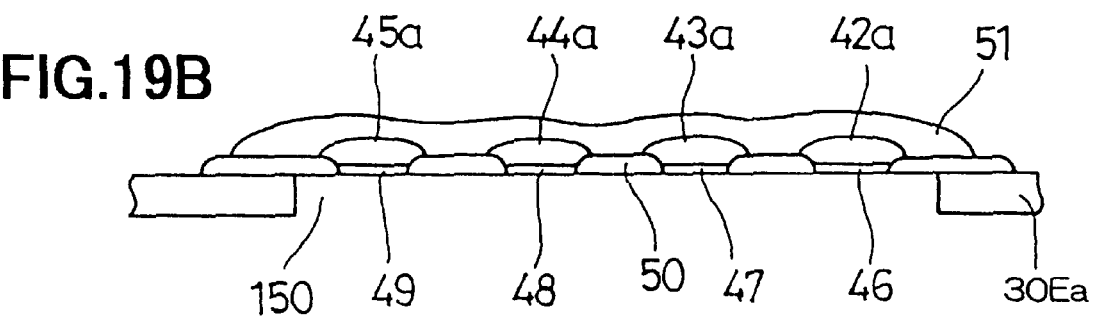
Figure 19C:
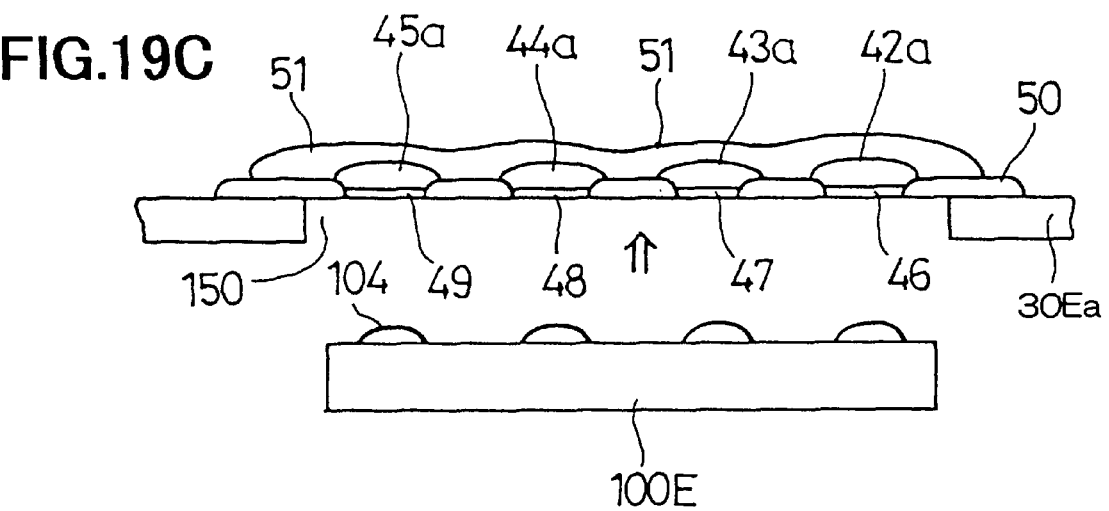

The suspension 30E has a stainless steel plate 30Ea as a body thereof. A base layer 50 made of polyimide having the property of insulation is formed over the entirety of the top surface of the stainless steel plate 30Ea. On the top surface of the base layer 50, wiring patterns 42a, 43a, 44a, 45a, 42b, 43b, 44b, 45b made of Cu are formed. Further, the wiring patterns are covered and protected by a covering layer 51 made of polyimide. Further, pad terminals 46 through 49, 52 through 55 made of Au are provided at the ends of the wiring patterns 42a through 45a, 42b through 45b, and at a portion of the fixing portion 32E. As shown in FIG. 19A, the pad terminals 46 through 49, 52 through 55 are embedded in holes of the base layer 50 and formed directly on the top surface of the stainless plate 30Ea.

The head IC chip mounting portion 65E is formed at a portion of the fixing portion 32E of the suspension 30E at the fixed-end side thereof. As shown in FIGS. 17, 17A and 17B, the head IC chip mounting portion 65E includes an opening 150 which is formed in the stainless steel plate 30Ea and has a shape and a size corresponding to those of the head IC chip 100E, the base layer 50 which covers the top of the opening 150 so as to have a function of a ceiling, and the pad terminals 46 through 49, 52 through 55 which are exposed on the bottom surface of the base layer 50. The opening 150 is formed through etching.

Figure 18:
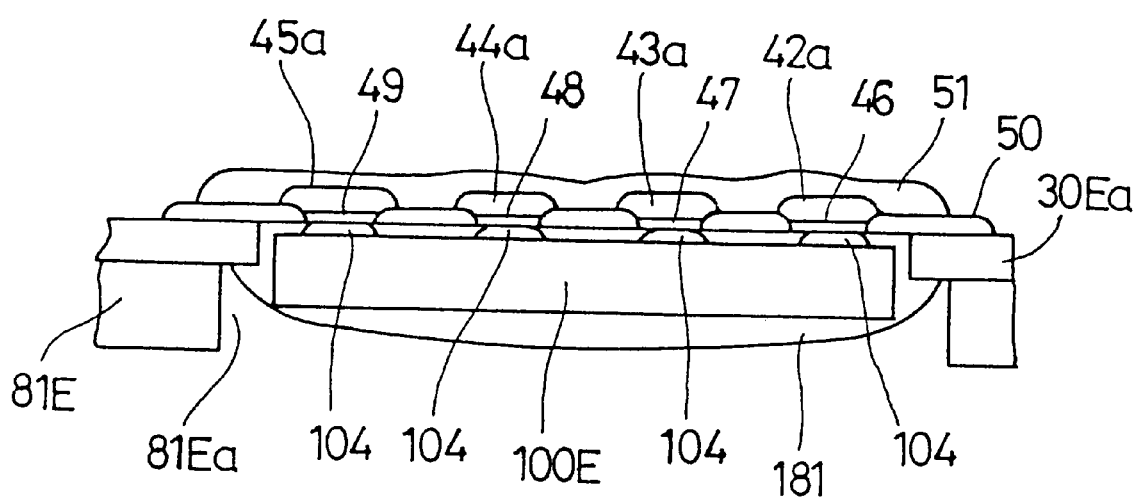
FIG. 18 shows a side elevational sectional view taken along a line XVIII—XVIII of FIG. 17.

As shown in FIGS. 17, 17A, 17B, 18 and 19C, in a condition in which the head IC chip 100E is fitted into the opening 150, pad terminals 104 provided on the top surface of the head IC chin 100F are electrically connected with the pad terminals 46 through 49, 52 through 55. Further, as shown in FIG. 18, the head IC chip 100E is covered by a synthetic resin 181, and is adhered to the stainless plate 30Ea. Thus, the head IC chip 100E is mounted on the head IC chip mounting portion 65E.

As shown in FIGS. 17, 17A, 17B, 17C and 18, an opening window 81Ea is formed in a suspension fixing portion 81E of the junction member 80E. The opening window 81Ea has a size and a shape corresponding to those of the bare head IC chip mounting portion 65E and the bare head IC chip 100E mounted on the head IC chip mounting portion 65E is inserted into the opening window 81Ea.

The fixing portion 32E of the suspension 30E is mounted on the suspension fixing portion 81E of the junction portion 80E, and welding is performed at a plurality of portions 165. Thus, the suspension 30E is connected with the junction member 80E. A lower portion of the bare head IC chip 100E mounted on the bare head IC chip mounting portion 65E is contained by the opening window 81Ea, as shown in FIG. 18.

Figure 22:
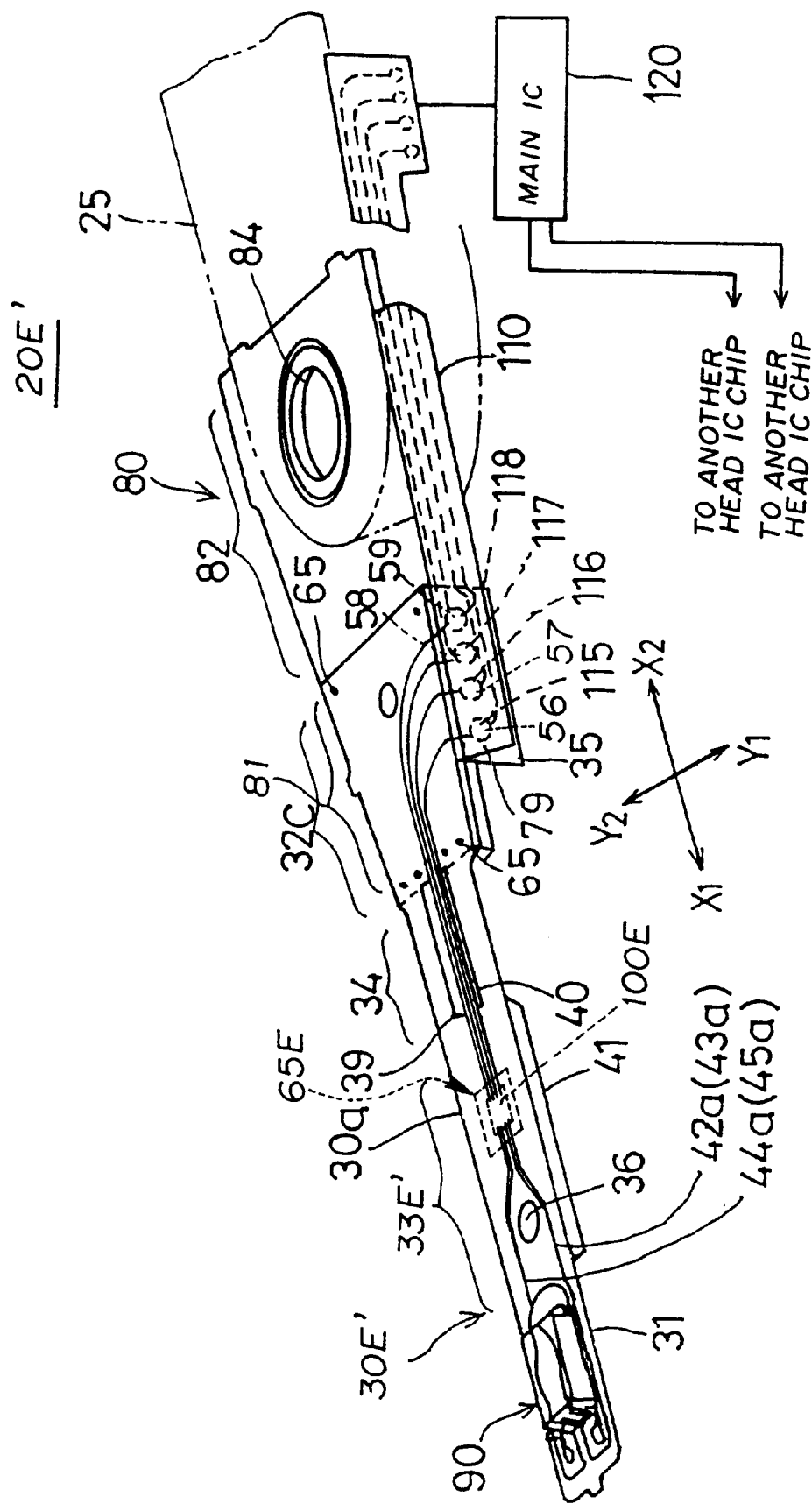
FIG. 22 shows a magnetic head slider supporting device in a ninth embodiment of the present

It is possible that the above-described bare head IC chip mounting portion 65E is formed at a portion of a rigid portion 33E as shown in the FIG. 22, as in the case of FIG. 2. Except for the head IC chip mounting portion 65E, the structure of a magnetic head slider supporting device 20E' shown in FIG. 22 is the same as the structure of the magnetic head slider supporting device 20 shown in FIG. 2, and a description thereof will be omitted.

Further, it is possible to replace each of the magnetic head slider supporting devices 20-1, 20-2, 20-3 and 20-4 of the magnetic disk device 21 shown in FIGS. 3A and 3B with each of the above-described head slider supporting devices in the second, third, fourth, fifth, sixth, seventh, eighth and ninth embodiments of the present invention. Except for the magnetic head slider supporting devices, each of the magnetic disk devices resulting from this replacement has a structure the same as that of the magnetic disk device 21. Therefore, figures and descriptions thereof will be omitted.

The present invention can also be applied to a head slider supporting device in which, instead of the magnetic head slider, an optical head slider, which is integrally provided with an optical head and a slider, is mounted on the head slider supporting device. Thus, the present invention can be applied to the suspension for an optical head slider, an optical head slider supporting device and an optical disk device.

Further, the present invention is not limited to the above-described embodiments, and variations and modifications may be made without departing from the scope of the present invention.

The contents of the basic Japanese Patent Application Nos.9-287342 and 10-72883, filed on Oct. 20, 1997 and Mar. 20, 1998, respectively, are hereby incorporated by reference.

What is claimed is:

1. A head slider supporting device comprising:
a suspension mounted on a guide arm via a spacer, said suspension being a substantially flat plate and having a head slider mounting portion and a head IC chip mounting portion; and
said spacer supported on said guide arm on one side, and supporting said suspension on an opposing side,
wherein said head slider mounting portion has a surface for mounting a head slider directly on a first side of said suspension,
wherein said head IC chip mounting portion is located at a position of said suspension supported by said spacer on a second side of said suspension, and
wherein said spacer has a head IC chip mounting space for accommodating at least a part of a head IC chip.

2. The head slider supporting device as claimed in claim 1,
wherein said head IC chip mounting portion has an opening, a bend portion bent along said opening and toward the second side of said suspension, and a flat portion connected to said bend portion and having a surface substantially parallel to said suspension for directly mounting said head IC chip, and
wherein said opening, said bend portion and said flat portion form a recess for accommodating a part of said head IC chip, said recess being held by said head IC chip mounting portion.

3. The head slider supporting device as claimed in claim 2, further comprising a head IC chip mounted on said surface of said flat portion of said head IC chip mounting portion.

4. The head slider supporting device as claimed in claim 3, further comprising a head slider mounted on said surface of said head slider mounting portion.

5. The head slider supporting device as claimed in claim 2,
wherein said opening comprises a pair of slits defining a bridge portion therebetween, said bridge portion having a first end and a second end,
wherein said bend portion comprises a pair of bend portions formed at said first and said second ends of said bridge portion respectively, and
wherein said flat portion is formed between said pair of bend portions.

6. The head slider supporting device as claimed in claim 2,
wherein said opening comprises an H-shaped opening defining a pair of tongue portions, each of said tongue portions having a free end facing one another,
wherein said bend portion comprises a pair of bend portions formed at an end of each of said pair of tongue portions opposite to said free ends, respectively, and
wherein said flat portion comprises a pair of flat portions formed at said free ends of said tongue portions, respectively.

7. The head slider supporting device as claimed in claim 2, wherein said bend portion is bent by a pressing process.

8. The head slider supporting device as claimed in claim 1, further comprising:
a first wiring pattern extending from said head slider mounting portion to said head IC chip mounting portion; and
a second wiring pattern extending from said head IC chip mounting portion.

9. The head slider supporting device as claimed in claim 1,
wherein said head slider mounting portion is located at a distal end of said suspension, and
wherein said IC chip mounting portion is located between said head slider mounting portion and a proximal end of said suspension.

10. The head slider supporting device as claimed in claim 1, further comprising a suspension mounting plate mounted on said second side of said suspension at a proximal end of said suspension.

11. The head slider supporting device as claimed in claim 10, wherein said head IC chip mounting portion is located between said head slider mounting portion and said suspension mounting plate.

12. The head slider supporting device as claimed in claim 10,
wherein said head IC chip mounting portion is located at a proximal end of said suspension, and
wherein a bend portion of said head IC chip mounting portion is inserted into an opening of said mounting plate.

13. The head slider supporting device as claimed in claim 1,
   wherein said suspension has a rib portion formed therealong such as to form a rigid portion therein, and
   wherein said head IC chip mounting portion is formed in said rigid portion.

14. The head slider supporting device as claimed in claim 1, wherein said head IC chip mounting portion comprises:
   a pair of slits defining a bridge portion therebetween, said bridge portion having a first end and a second end;
   a pair of bend portions formed at said first and second ends of said bridge portion respectively, and bent toward said second side of said suspension, and
   a flat portion formed between said pair of bend portions and having a surface substantially parallel to said suspension for directly mounting said head IC chip, and
   wherein said pair of slits, said pair of bend portions and said flat portion form a recess for accommodating at least a part of said head IC chip, said recess being held by said head IC chip mounting space of said spacer.

15. The head slider supporting device as claimed in claim 14,
   wherein said suspension has a rib portion formed therealong such as to form a rigid portion therein, and
   wherein said head IC chip mounting portion is formed in said rigid portion.

16. The head slider supporting device as darned in claim 1,
   wherein said head IC chip mounting portion comprises an opening, a base layer covering said opening on said first side of said suspension, and pad terminals exposed on a surface of said base layer toward said second side of said suspension, and
   wherein said head IC chip is mounted on said head IC chip mounting portion, accommodated by both said opening and said head IC chip mounting space of said spacer, and electrically connected with said pad terminals.

* * * * *

UNITED STATES PATENT AND TRADEMARK OFFICE
CERTIFICATE OF CORRECTION

PATENT NO.    : 6,583,962 B2
DATED         : June 24, 2003
INVENTOR(S)   : Ohwe et al.

It is certified that error appears in the above-identified patent and that said Letters Patent is hereby corrected as shown below:

Column 28,
Line 7, delete "darned" and insert -- claimed --.

Signed and Sealed this

Thirteenth Day of January, 2004

JON W. DUDAS
*Acting Director of the United States Patent and Trademark Office*